(12) United States Patent
Uthaman et al.

(10) Patent No.: US 11,171,720 B1
(45) Date of Patent: Nov. 9, 2021

(54) CONTENT AND COMPUTE DELIVERY PLATFORM USING SATELLITES

(71) Applicant: Amazon Technologies, Inc., Seattle, WA (US)

(72) Inventors: Karthik Uthaman, Seattle, WA (US); Prashant Verma, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 16/456,932

(22) Filed: Jun. 28, 2019

(51) Int. Cl.
*H04B 7/185* (2006.01)
*G06F 12/12* (2016.01)
*B64G 1/10* (2006.01)

(52) U.S. Cl.
CPC ......... *H04B 7/18584* (2013.01); *G06F 12/12* (2013.01); *H04B 7/18595* (2013.01); *B64G 1/10* (2013.01)

(58) Field of Classification Search
CPC ............ H04L 67/2814; H04L 67/2842; H04B 7/1851; H04B 7/18595; H04B 7/18591; H04B 7/18521
See application file for complete search history.

(56) References Cited

U.S. PATENT DOCUMENTS

| | | | | |
|---|---|---|---|---|
| 5,867,706 A * | 2/1999 | Martin | ...................... | H04L 29/06 718/105 |
| 6,002,916 A * | 12/1999 | Lynch | ................. | H04B 7/18578 455/12.1 |
| 6,085,193 A * | 7/2000 | Malkin | ................ | G06F 16/9574 |
| 8,712,321 B1 * | 4/2014 | Dankberg | ........... | H04B 7/18519 455/12.1 |
| 9,591,047 B1 * | 3/2017 | Newton | ............... | H04L 67/1004 |
| 9,961,008 B2 * | 5/2018 | Barda | ................ | H04W 56/0045 |
| 10,419,106 B1 * | 9/2019 | Liu | ..................... | H04B 7/18515 |
| 2007/0233705 A1 * | 10/2007 | Farber | ..................... | H04L 29/06 |
| 2008/0215755 A1 * | 9/2008 | Farber | ................. | H04L 67/2895 709/245 |
| 2010/0265879 A1 * | 10/2010 | Foxworthy | ........ | H04B 7/18591 370/316 |
| 2014/0215018 A1 * | 7/2014 | Lam | ...................... | H04L 63/108 709/219 |
| 2016/0105232 A1 * | 4/2016 | Michel | ................ | H04L 67/2842 370/316 |
| 2016/0191651 A1 * | 6/2016 | Balakrishnan | ...... | H04L 67/1097 709/219 |
| 2016/0233950 A1 * | 8/2016 | Chuberre | ........... | H04B 7/18528 |
| 2017/0195040 A1 * | 7/2017 | Sobhani | ................. | H04B 10/29 |
| 2017/0202004 A1 * | 7/2017 | Hurd | ................. | H04W 28/0278 |
| 2017/0244682 A1 * | 8/2017 | Chen | ....................... | G06F 21/64 |
| 2020/0007226 A1 * | 1/2020 | Takagi | .................. | H04W 8/082 |

* cited by examiner

*Primary Examiner* — Douglas B Blair
(74) *Attorney, Agent, or Firm* — NDWE LLP

(57) ABSTRACT

Techniques for using a satellite as a part of a content delivery network are described. For example, in some instances a satellite is to receive a request for a resource hosted by the content delivery network, determine that the request for the resource cannot be served by the satellite, determine a first entity to ask for the resource, send a secondary request for the resource to the determined first entity, receive the resource from the determined first entity, respond, to a user of the content delivery network, to the request using the received resource for the resource, and respond to a subsequent request using the cached received resource.

18 Claims, 16 Drawing Sheets

CONTENT AND COMPUTE DELIVERY PLATFORM USING SATELLITES

BACKGROUND

Content delivery networks (CDNs) geographically distribute content to improve the user experience of accessing content on a network. In particular, the performance of widespread networks such as the internet is limited in part by the physical distance separating two computer systems. As that distance increases, the amount of time for a signal to transmit between the computer systems increases as does (typically) the number of routing hops, each hop or intermediate computer system introducing delay. Furthermore, if a single computer system hosts the requested content, a failure of that computer system prevents the content from being delivered to all users. CDNs reduce delays and points of failure by maintaining computer equipment to host and provide content at many locations, sometimes called "points of presence" or content delivery network nodes (CDNNs). For example, a CDN customer may host a web page with the CDN. The CDN replicates the web page in many locations, such as a CDNN in Tokyo and another in London so that a user in the United Kingdom would receive the web page from the London CDNN while a user in Japan would receive the web page from the Tokyo CDNN. Land based CDN locations are limited by network and transit connectivity provided by peering networks.

BRIEF DESCRIPTION OF DRAWINGS

Various embodiments in accordance with the present disclosure will be described with reference to the following drawings.

DETAILED DESCRIPTION

Figure 1:
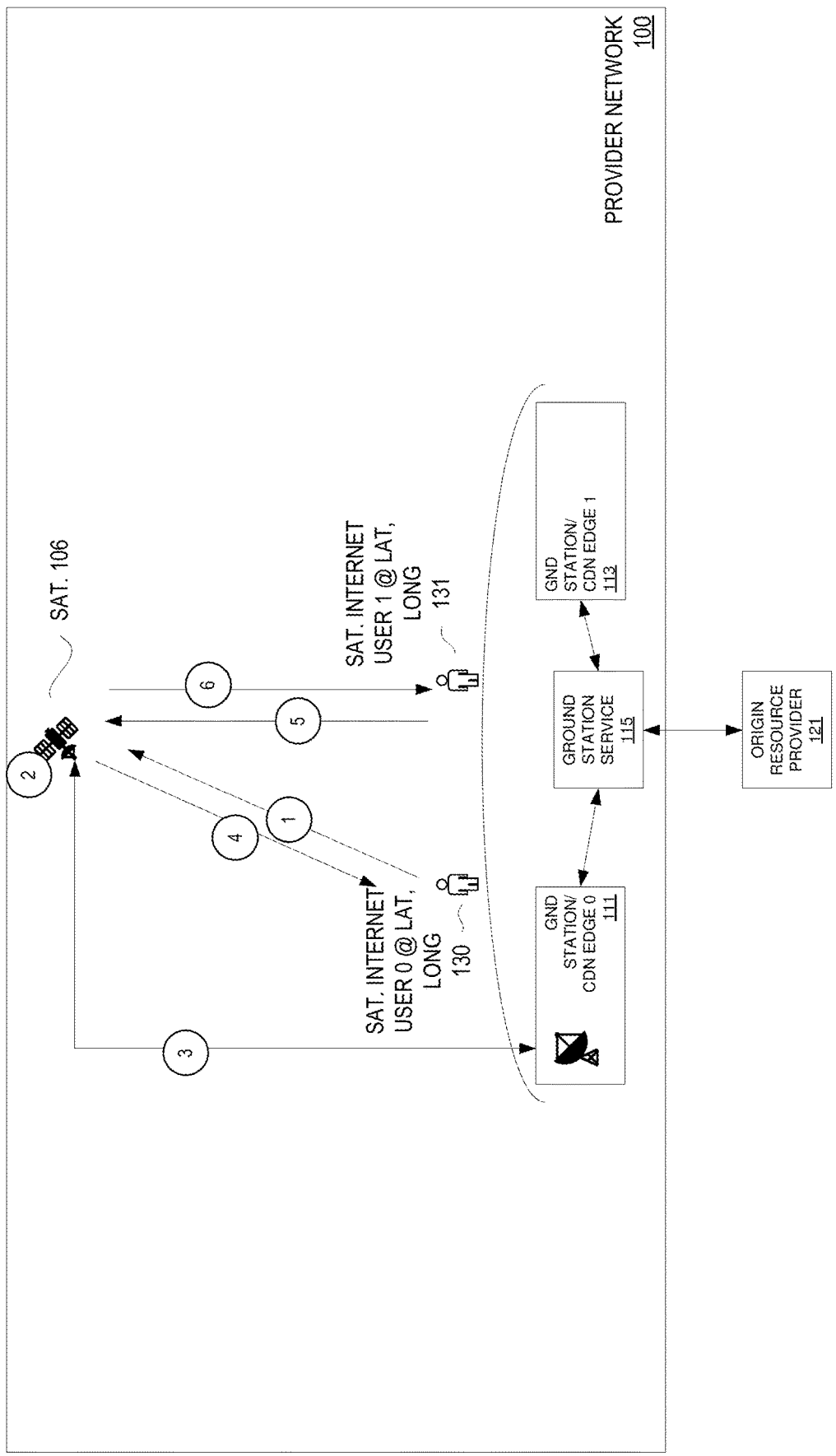
FIG. 1 illustrates embodiments of a system utilizing a satellite as a part of an on-demand content delivery network.

Various embodiments of methods, apparatus, systems, and non-transitory computer-readable storage media for on-demand resources (content and compute delivery) using satellites are described. In particular, embodiments of a mesh comprising a content delivery network (CDN) with satellites are described. The content delivery network works in conjugation with the ground stations of a provider network to deliver low latency content and compute access to astronauts, remote satellites, and remote users on earth without direct internet access.

According to some embodiments, a provider network provides content distribution services via contend delivery network nodes—sometimes referred to as edge locations—that are geographically dispersed including some CDNNs that are included in a satellite that communicate with one or more ground stations. Customers of the operator of the provider network can host their content within the provider network, and the provider network facilitates the distribution of that content to the customer's users. A user's request for a resource is routed to a proxy server within a CDNN that is geographically proximate to the source of the request, and the proxy server fulfills the request from content cached within the CDNN, if available. Typically, the customer can track and manage its content and content distribution to users in an off-line manner or with a backend service that involve considerable delay. That is, the customer can aggregate data related to content distribution and adjusts the content and/or behavior of the content distribution based on the aggregated data. Such approaches, however, limit the responsiveness of the content and/or content distribution to the customer's users. Note that in a provider network, a satellite's resources may be shared between customers of that provider network in some embodiments.

A satellite antenna ground station service may include multiple ground stations and associated data centers spread throughout the mid-latitude regions of the earth such that a client satellite is in range (or will be in range momentarily) of at least one ground station of the satellite antenna ground station service regardless of a position of the satellite in the satellite's orbit.

For example, a provider network may include a ground station and associated data center in the Pacific Ocean, either on an island or implemented on an ocean going vessel or platform. The provider network may also include a ground station and data center on the Pacific Coast of the United States that is connected to data center via network connection, which may be a fiber-optic high-speed cable, as an example. Further, in some embodiments, each of the data centers of provider network may be connected to one another via high-speed connections. In some embodiments, more or fewer high-speed connections may be included in a provider network between data centers.

Detailed herein are embodiments pertaining to the use of a dataplane to process incoming resource requests. For example, each satellite has a portion of content delivery network infrastructure along with edge compute capabilities (one or more compute nodes) allowing for small workflows to run inside the satellites (such as low earth orbit (LEO), medium earth orbit (MEO), and/or geo-synchronous). In some embodiments, the satellites use the SCPS-TP protocol to communicate with end users (those making requests for CDN content) and origins (ground stations). SCPS-TP is a modification of TCP that is efficient for space environments and may provide better transport layer performance in space networks. In some embodiments, a control plane is included in ground stations to allow customers to upload new workflows/rule engines to the CDN compute nodes running in remote satellites.

For example, in some embodiments, whenever a request comes from a remote satellites or astronauts, the satellites will be able to intercept the request pass it through its rule engines to determine what to do with the request (such as cache the content, provide it to a user, or provide it or peer satellites).

There are many potential benefits including: a) avoiding transmissions of signal back to Earth when a resource is unavailable; b) cache in geo-synchronous satellite layer which can share data with its peers; c) moving running compute logic away from single location on Earth; d) updating the rule engines dynamically from a control plane; e) reducing the round trip time (RTT) and the perceived latency of communications (this also allows remote satellites to communicate faster, so instead of the remote satellite taking X ms to send a message requesting updates from the ground station, and keeping the communication channel open and powered on until it gets the updates, the remote satellite can get the cached updates from the geo-synchronous satellite much faster and power down its communication channel in Y ms once it gets the updates (where Y<X); f) as geo-synchronous satellites are not affected by the weather/conditions on earth, they can ingest signals from remote satellites; and/or g) space telescopes can benefit from the CDN compute capabilities by running compression algorithms defined in the compute workflows before sending the data back.

FIG. 1 illustrates embodiments of a system utilizing a satellite as a part of an on-demand content delivery network. In particular, a first satellite internet user 130, at a particular latitude and longitude, connects to a satellite 106 to get a resource that the satellite 106 does not initially have. In a typical scenario, to get the resource from a ground station (such as ground station 111 or 113) is cumbersome. As shown, the satellite 106 acts as a CDNN.

A ground station (such as ground station 111 or 113) communicates with the satellite 106. The ground stations 111 and 113 may cache resources from an origin provider 121 and/or be coupled to data centers that perform this storage. In some embodiments, a ground station also serves as a CDNN.

An origin resource provider 121 communications with the provider network 100 via a ground station service 115 (detailed later) which is usable to control at least some actions of the ground stations 111 or 113.

A satellite internet user at a particular latitude and longitude may make a request for a resource to be served from the satellite 106. In particular, the latitude and longitude of the user determine which satellite the user is closest to and that closet satellite is to receive the request.

In this example, the satellite internet user 0 130 makes a request for a resource from the satellite 106 at circle 1. The satellite 106 makes a determination at circle 2 that it does not have that resource cached. Note this would be typically of a satellite that was not acting as a CDNN too as it would be virtually impossible to cache all of the content that all of the users that connect to that satellite 106 would want.

At circle 3, the satellite 106 requests and receives the resource from the ground station/CDN edge 0 111. In this illustration, the resource is cached at the satellite 106 for use by other users.

At circle 4, the satellite 106 serves the resource to the requesting user 130. At some point later in time, a second satellite internet user 131 requests the same resource at circle 5. Since it was cache, the satellite 106 serves the cached resource at circle 6 thus saving the need to go back to a ground station for the resource.

While FIG. 1 highlights some benefits of caching in a satellite, at least FIGS. 2-7 introduce the concept of clusters of combinations of LEO, MEO, and/or geo-synchronous satellites for use as CDNNs as a part of a CDN. Note, when satellite is a geo-synchronous satellite, it tends to not communicate with other satellites and not all LEO and/or MEO satellites can communicate with other satellites either. Note that a satellite may belong to more than one cluster and clusters may change.

Typically, a satellite provider operates in a specific radio band such as Ka, Ku, K, V, etc. using an assigned wavelength range. For example, when a constellation is deployed in the Ka band using x-y GHZ range, then the satellites will be pre-programmed to work on those wavelengths. In some instances, there is a 1:1 mapping of each satellite in a constellation to a specific wavelength that is in the range x-y. In other instances, all of the satellites are capable of receiving in the wavelengths x-y and a closest one will get a request first and will process it. In general, many satellites do not have a mechanism to communicate with other satellites, but those that do and mostly use radio waves or laser beams (line-of-sight).

In some embodiments, the client (user) device includes software to route to an appropriate satellite or cluster. In particular, this software causes the hardware of the client device to ping nearby satellites and keep a list of those satellites that it can reach at any given point in time. In some embodiments, the client device picks a satellite by hashing a domain name. This allows for sharding content by domain on one or more satellite CDNNs.

When LEO and/or MEO satellites are used, the hashing should be consistent even though those satellites move. For example, in a first vicinity satellites S1, S2, and S3 are available and in a second vicinity satellites S4, S5, S6 are available. If a user in the first vicinity is watching content from a particular service it, his/her device should pick satellite S3, while the user in the second vicinity would pick S6. After a time period has elapsed, the constellation has moved, the first vicinity has S0, S1, and S2 and the second vicinity has S3, S4, and S5. The user in the first vicinity lost access to the particular service (lost S3) and his/her device will need to pick a new one. While the user in the second vicinity lost S6, he/she did get S3 and will route to that. Since all the satellite's location is predetermined based on their orbit, the hashing algorithm on the client's dish device may be configured to select the same satellite during a given period of time for a given domain. This eliminates the complexity of the pinging all the nearby satellites and keeping track of the known satellites that are available for communication.

When satellites can communicate with each other, a similar routing mechanism may be used to get content from a nearby satellite. This should be weighted routing that is optimized for lower latency. As such, if a ground station is has lower latency, the satellite should get the resource from there over a nearby satellite.

Figure 2:
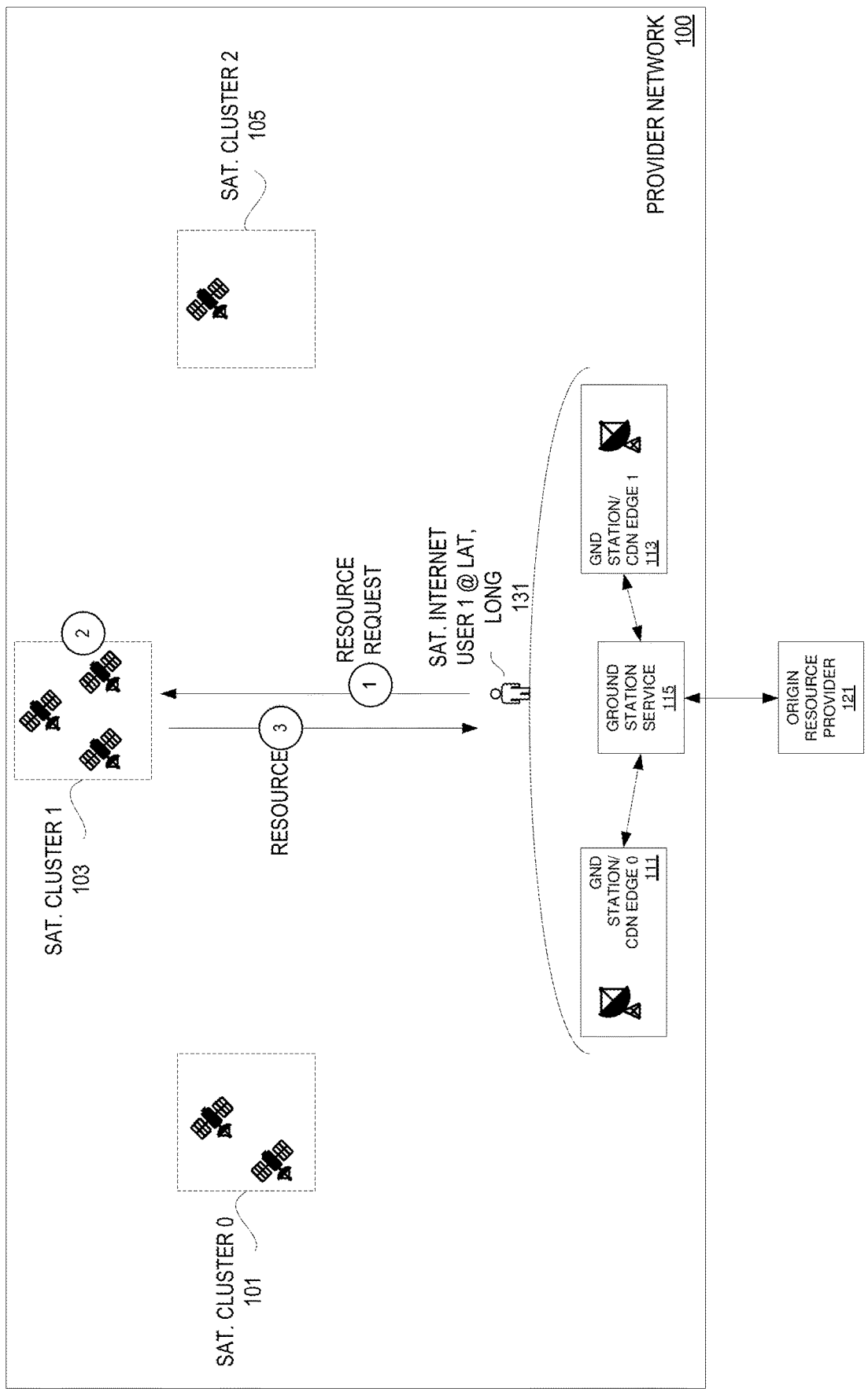
FIG. 2 illustrates embodiments of a system utilizing satellites as a part of an on-demand content delivery network provided by a provider network.

FIG. 2 illustrates embodiments of a system utilizing satellites as a part of an on-demand content delivery network provided by a provider network. As shown, the provider network 100 includes one or more satellites, that act as on-demand CDNNs, in a plurality of satellite clusters 0-2 101-105. As such, one or more of the satellites cache content closer to end-users than an available ground based CDN edge device. That is the satellites/CDNNs represent geographically dispersed portions of a provider network, each capable of serving cached content to end-user. Such content can include, for example, the web site of a customer of the operator of the provider network. For example, Company A can host its website—www.companya.com—with the provider network and a portion of that website are cached by a CDNN. Note that the CDNNs of satellite cluster may store different portions of the content such as different pages of a website. In some embodiments, each satellite of a cluster 101-105 is communicatively coupled to the other satellites of the cluster. CDNNs may also provide compute functionality. As such, a request is for a resource (compute or content). Note that a cluster may include a single satellite, a plurality of satellites, and/or satellites of different types.

A ground station (such as ground station 111 or 113) communicates with one or more satellite clusters 101-105. For example, ground station 111 communicates with one or more satellites of satellite cluster 101. The ground stations 111 and 113 may cache resources from an origin provider 121 and/or be coupled to data centers that perform this storage. In some embodiments, a ground station also serves as a CDNN. Note that in this illustration the satellite cluster 1 103 cannot communicate directly with any ground station that has resources that the user 131 may want. Note that in some embodiments, communications between satellites use different communication channels than communications between a satellite and ground station.

An origin resource provider 121 communications with the provider network 100 via a ground station service 115 (detailed later) which is usable to control at least some actions of the ground stations 111 or 113.

A user at a particular latitude and longitude may make a request for a resource to be served from a satellite cluster. In particular, the latitude and longitude of the user determine which satellite cluster the user is closest to and that closet cluster is to receive the request.

In this illustration, the use case is fairly simple in that the request is for a resource such as content or compute that is available in the receiving satellite cluster. A user 131 is closest to satellite cluster 1 103 and makes a request for content from the content provider 121 and/or for some compute function to be performed by the CDNN at circle 1.

One or more of the satellites of the satellite cluster 1 103 receive this request and make a determination of if the request can be served at circle 2. As noted above, content may be spread across satellites of a cluster such that this determination may mean determining one or more of: 1) what is in the respective caches (such as a CDNN content cache server 825) of each satellite in the cluster (this is typically performed by a proxy server 820 of one or more of the CDNNs of the cluster) and a) serving from the cluster if the request is for content cached in the cluster or b) requesting the content from another satellite or ground station if the content is not stored to be cached and then served; and 2) if there is a compute function to be executed if that compute function is supported and performing that compute function using existing state using a compute function execution unit 825.

At circle 3, the content and/or compute result is provided by the receiving satellite to the requesting user 131.

Figure 3:
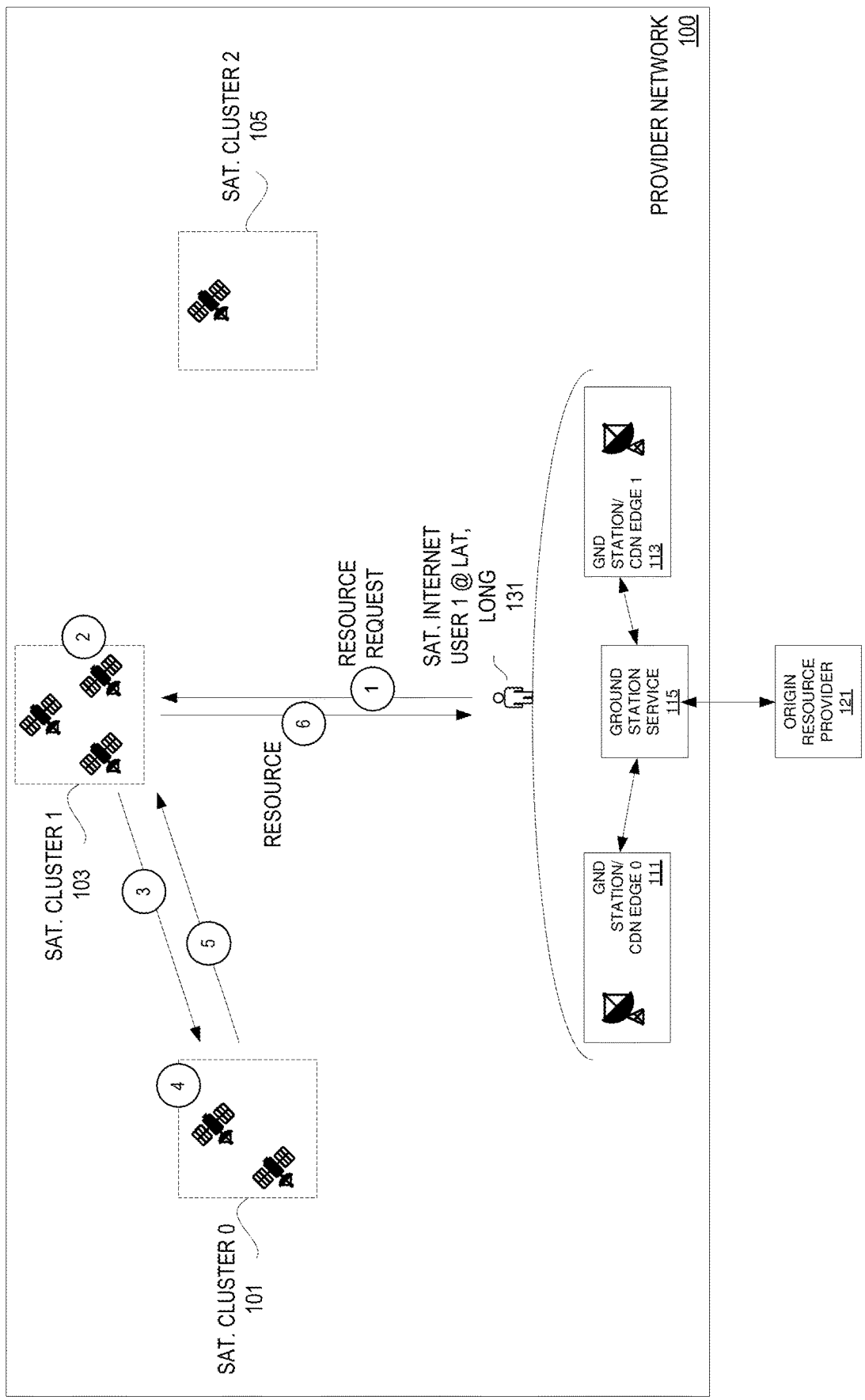
FIG. 3 illustrates embodiments of a system utilizing satellites as a part of an on-demand content delivery network provided by a provider network.

FIG. 3 illustrates embodiments of a system utilizing satellites as a part of an on-demand content delivery network provided by a provider network. In particular, using the same reference numerals as FIG. 1, etc., this illustration shows a use case where a request is for content or a compute function that is not initially available in the receiving satellite cluster.

A user 131 is closest to satellite cluster 1 103 and makes a request for a resource such as content from the content provider 121 and/or for some compute function to be performed by the CDNN at circle 1.

One or more of the satellites of the satellite cluster 1 103 receive this request and make a determination of if the request can be served at circle 2. As noted above, content may be spread across satellites of a cluster such that this determination may mean determining one or more of: 1) what is in the respective caches (such as a CDNN content cache server 825) of each satellite in the cluster (this is typically performed by a proxy server 820 of one or more of the CDNNs of the cluster) and a) serving from the cluster if the request is for content cached in the cluster or b) requesting the content from another satellite or ground station if the content is not stored to be cached and then served; and 2) if there is a function to be executed if that function is supported and performing that function using existing state using a function execution unit 825.

In this scenario, the request cannot be fulfilled by the satellite cluster 1 103. A CDNN of the satellite cluster 1 103 will then make a secondary request for the resource from another entity. Depending upon the implementation, this secondary request may be to: 1) one nearby different satellite cluster (in this illustration satellite cluster 0 101); 2) a plurality of nearby satellite clusters; and/or 3) to a ground station. In this illustration, the secondary request is to a single nearby satellite cluster 0 101. In some embodiments, the satellite cluster making this secondary request directs it to a particular entity based on a priori knowledge that a receiving satellite cluster has the resource cached or is in communication with an entity that has the resource (such as another satellite cluster or a ground station). In some embodiments, the secondary request is sent without any a priori knowledge of what is available from a particular receiver. Note that the satellites may communicate with other satellites using different protocols than would be used to communicate with a user on the ground or with a ground station.

The one or more satellite clusters that received the secondary request make a determination of if the request can be served at circle 4. In this example, the answer to that determination is yes as the satellite cluster 0 101 has the resource cached and the resource is sent to the requesting satellite cluster 103 at circle 5.

At circle 6, the content and/or compute result is provided by the receiving satellite to the requesting user 131.

Figure 4:
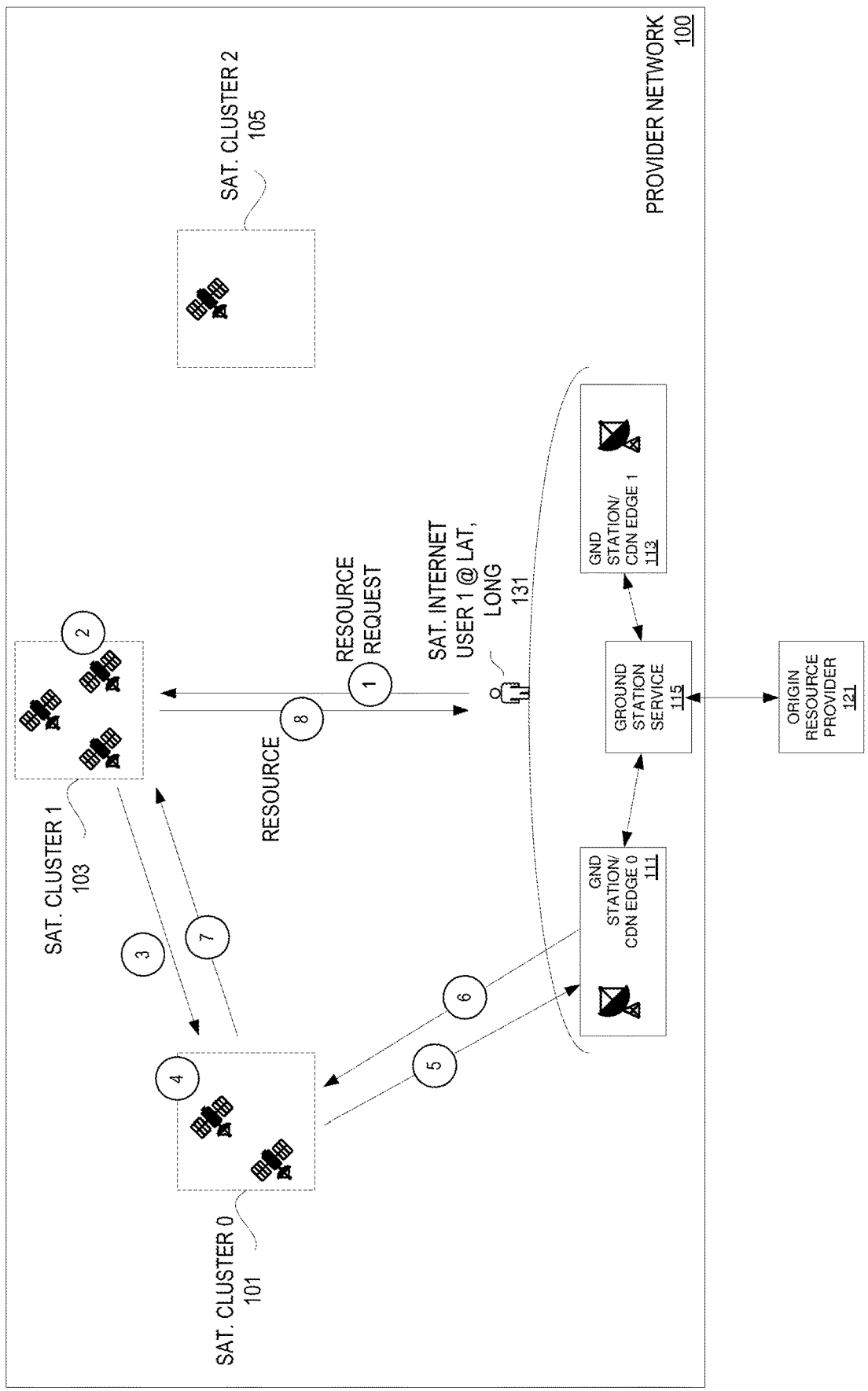
FIG. 4 illustrates embodiments of a system utilizing satellites as a part of an on-demand content delivery network provided by a provider network.

FIG. 4 illustrates embodiments of a system utilizing satellites as a part of an on-demand content delivery network provided by a provider network. In particular, using the same reference numerals as FIG. 1, etc., this illustration shows a use case where a request is for content or a compute function that is not initially available any satellite cluster directly accessible by the request receiving CDNN.

A user 131 is closest to satellite cluster 1 103 and makes a request for a resource such as content from the content provider 121 and/or for some compute function to be performed by the CDNN at circle 1.

One or more of the satellites of the satellite cluster 1 103 receive this request and make a determination of if the request can be served at circle 2. As noted above, content may be spread across satellites of a cluster such that this determination may mean determining one or more of: 1) what is in the respective caches (such as a CDNN content cache server 825) of each satellite in the cluster (this is typically performed by a proxy server 820 of one or more of the CDNNs of the cluster) and a) serving from the cluster if the request is for content cached in the cluster or b) requesting the content from another satellite or ground station if the content is not stored to be cached and then served; and 2) if there is a function to be executed if that function is supported and performing that function using existing state using a function execution unit 825.

In this scenario, the request cannot be fulfilled by the satellite cluster 1 103. A CDNN of the satellite cluster 1 103 will then make a secondary request for the resource from another entity. Depending upon the implementation, this secondary request may be to: 1) one nearby different satellite cluster (in this illustration satellite cluster 0 101); 2) a plurality of nearby satellite clusters; and/or 3) to a ground station. In this illustration, the secondary request is to a single nearby satellite cluster 0 101. In some embodiments, the satellite cluster making this secondary request directs it to a particular entity based on a priori knowledge that a receiving satellite cluster has the resource cached or is in communication with an entity that has the resource (such as another satellite cluster or a ground station). In some embodiments, the secondary request is sent without any a priori knowledge of what is available from a particular receiver. Note that the satellites may communicate with other satellites using different protocols than would be used to communicate with a user on the ground or with a ground station.

The one or more satellite clusters that received the secondary request make a determination of if the request can be served at circle 4. In this example, the answer to that determination is no as the satellite cluster 0 101 does not have the resource cached.

Satellite cluster 0 101 makes a request for the content from a ground station/CDN edge 111 at circle 5. The ground station/CDN edge 111 provides the resource to the satellite cluster 0 101 at circle 6.

The resource is sent to the original satellite cluster 103 at circle 7. In some embodiments, it is cached at the satellite cluster 101. At circle 8, the content and/or compute result is provided by the receiving satellite to the requesting user 131.

Figure 5:
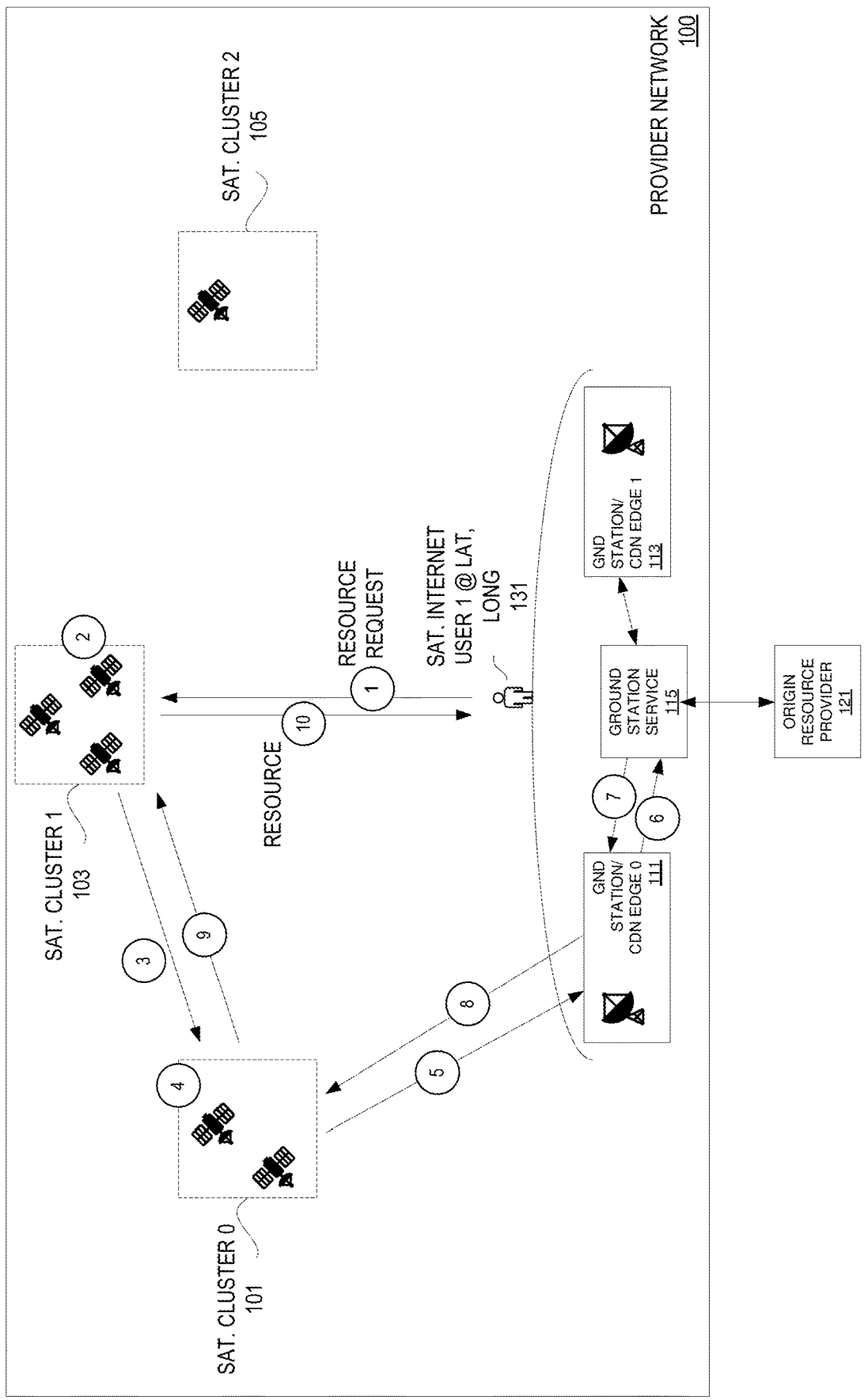
FIG. 5 illustrates embodiments of a system utilizing satellites as a part of an on-demand content delivery network provided by a provider network.

FIG. 5 illustrates embodiments of a system utilizing satellites as a part of an on-demand content delivery network provided by a provider network. In particular, using the same reference numerals as FIG. 1, etc., this illustration shows a use case where a request is for content or a compute function that is not initially available any satellite cluster.

A user 131 is closest to satellite cluster 1 103 and makes a request for a resource such as content from the content provider 121 and/or for some compute function to be performed by the CDNN at circle 1.

One or more of the satellites of the satellite cluster 1 103 receive this request and make a determination of if the request can be served at circle 2. As noted above, content may be spread across satellites of a cluster such that this determination may mean determining one or more of: 1) what is in the respective caches (such as a CDNN content cache server 825) of each satellite in the cluster (this is typically performed by a proxy server 820 of one or more of the CDNNs of the cluster) and a) serving from the cluster if the request is for content cached in the cluster or b) requesting the content from another satellite or ground station if the content is not stored to be cached and then served; and 2) if there is a function to be executed if that function is supported and performing that function using existing state using a function execution unit 825.

In this scenario, the request cannot be fulfilled by the satellite cluster 1 103. A CDNN of the satellite cluster 1 103 will then make a secondary request for the resource from another entity. Depending upon the implementation, this secondary request may be to: 1) one nearby different satellite cluster (in this illustration satellite cluster 0 101); 2) a plurality of nearby satellite clusters; and/or 3) to a ground station. In this illustration, the secondary request is to a single nearby satellite cluster 0 101. In some embodiments, the satellite cluster making this secondary request directs it to a particular entity based on a priori knowledge that a receiving satellite cluster has the resource cached or is in communication with an entity that has the resource (such as another satellite cluster or a ground station). In some embodiments, the secondary request is sent without any a priori knowledge of what is available from a particular receiver. Note that the satellites may communicate with other satellites using different protocols than would be used to communicate with a user on the ground or with a ground station.

The one or more satellite clusters that received the secondary request make a determination of if the request can be served at circle 4. In this example, the answer to that determination is no as the satellite cluster 0 101 does not have the resource cached.

Satellite cluster 0 101 makes a request for the content from a ground station/CDN edge 111 at circle 5. The ground station/CDN edge 111 in this example also does not have the resource and requests it from the content provider 121 via the ground station service 115 at circle 6 which provides the resource to the ground station/CDN edge 111 at circle 7 for sending to the satellite cluster 0 101 at circle 8.

In some embodiments, the request for the resource to the ground station and/or from the ground station to the ground station service 115 acts as a pre-fetch request. The pre-fetch may be based on similarity, previous use, or the fetching of an entire object (for example, if the resource is for a very large file the entire file may be fetched in chunks). For example, if it is typical or likely that an additional resource will be subsequently requested, the first entity may respond not only with the resource, but with that additional resource. The pre-fetch may, for example, mean the ground station service 115 asks the origin resource provider 121 for more than the request itself and passes this to the ground station 111. The pre-fetch may, for example, mean the ground station 11 asks the ground station service 115 for more than the request itself.

The resource is sent to the original satellite cluster 103 at circle 9. In some embodiments, it is cached at the satellite cluster 101. At circle 10, the content and/or compute result is provided by the receiving satellite to the requesting user 131.

Figure 6:
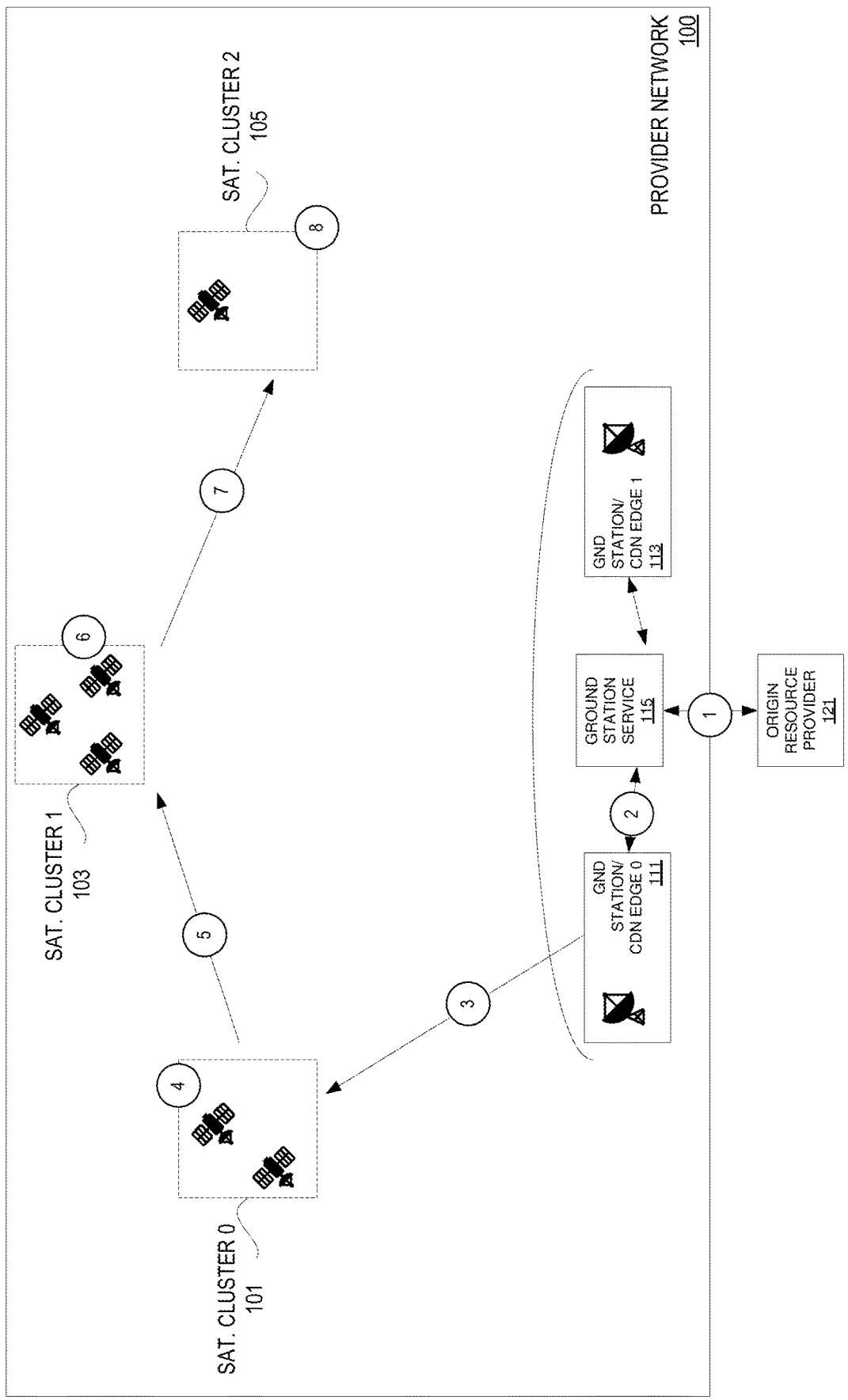
FIG. 6 illustrates embodiments of a system utilizing satellites as a part of an on-demand content delivery network provided by a provider network.

FIG. 6 illustrates embodiments of a system utilizing satellites as a part of an on-demand content delivery network provided by a provider network. In particular, using the same reference numerals as FIG. 1, etc., this illustration shows a use case of updating, via a control plane, resources such as compute functions and/or content. In this particular illustration, at least satellite cluster 1 103 is to be updated.

The content provider 121 interacts with a ground station service 115 which is coupled to one or more ground stations/CDN edges 111 and/or 113 at circle 1. In particular, a ground station service 115 allows for interaction with the ground station/CDN edge(s) that communicate with one or more CDNNs. Examples of embodiments of a ground service 115 and ground station 111 or 113 are detailed with respect to FIG. 13. It is through the ground station service that a client of the provider network 100 may cause an update of compute functions and/or content.

The provider network ground station service 115 processes this request and sends information about the update to be made to ground stations/CDN edges 111 and/or 113. In this example, this information is sent at circle 2 to the ground station/CDN edge 111. In some embodiments, the information is in the form of a parcel detailing the specifics of the what is to be updated is sent such as an identifier of the resource, where the origin of resource is found, a location to store the resource in the CDNN(s), instructions to propagate, permissions for the resource, etc.

The ground station/CDN edge 111 uses this information to get the resource from the origin resource provider 121 (if needed) and then sends the resource to its "coupled" satellite cluster (the cluster that it can communicate with) and any other information the satellite cluster may need (such as if the resource is to be propagated and to whom, etc.) at circle 3. In this example, the satellite cluster 0 101 receives the resource and caches it (in some embodiments) at circle 4 and propagates it at circle 5 to the satellite cluster 1 103 for caching at circle 6.

If the satellite cluster 2 105 is to be updated, in some embodiments, the satellite cluster 1 103 further propagates to the satellite cluster 2 105 at circle 7.

Figure 7:
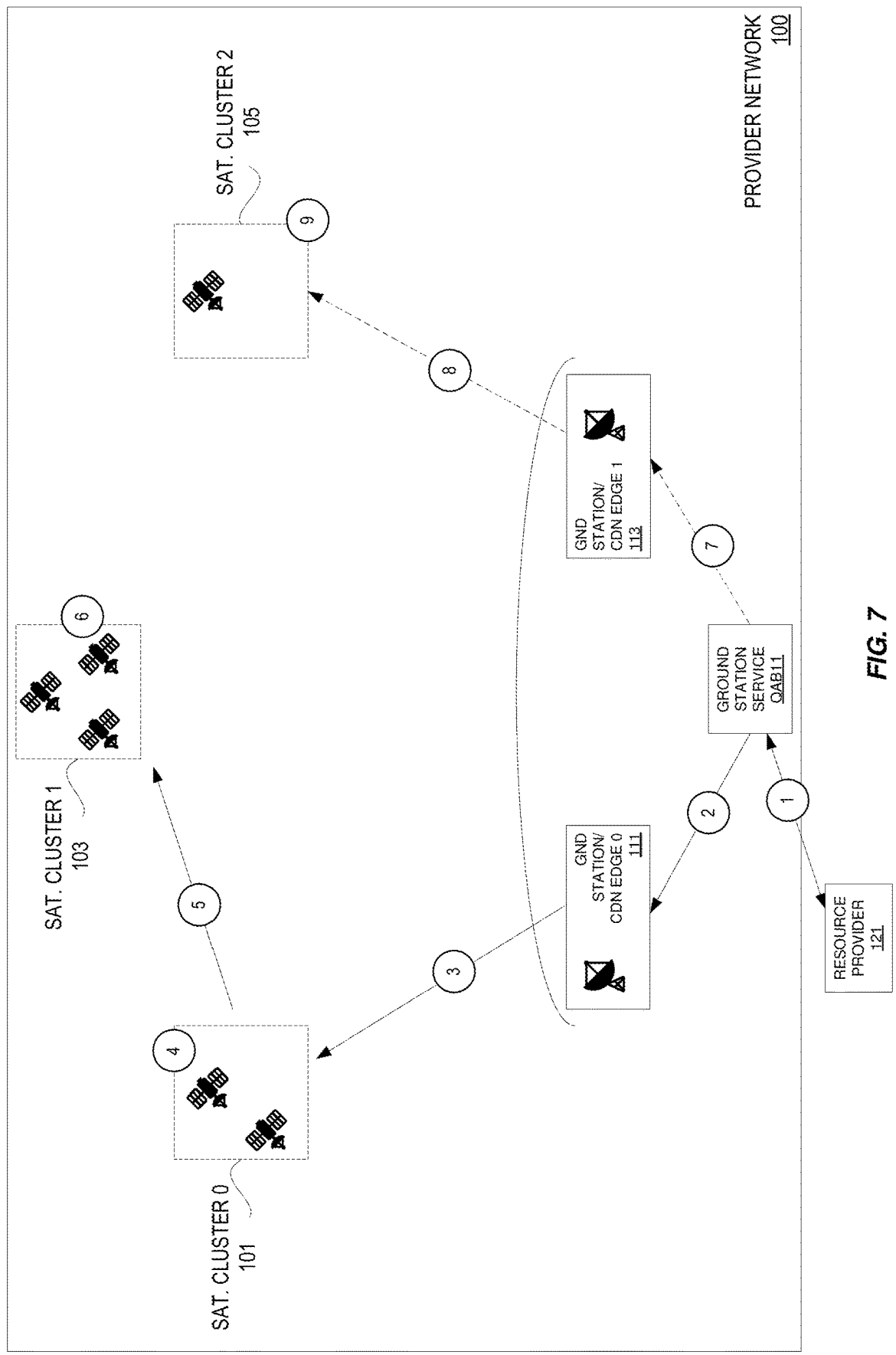
FIG. 7 illustrates embodiments of a system utilizing satellites as a part of an on-demand content delivery network provided by a provider network.

FIG. 7 illustrates embodiments of a system utilizing satellites as a part of an on-demand content delivery network provided by a provider network. In particular, using the same reference numerals as FIG. 1, etc., this illustration shows a use case of updating, via a control plane, resources such as compute functions and/or content. In this particular illustration, at least satellite cluster 1 103 is to be updated.

The content provider 121 interacts with a ground station service 115 which is coupled to one or more ground stations/CDN edges 111 and/or 113. In particular, a ground station service 115 allows for interaction with the ground station/CDN edge(s) that communicate with one or more CDNNs. Examples of embodiments of a ground service 115 and ground station 111 or 113 are detailed with respect to FIG. 13. It is through the ground station service that a client of the provider network 100 may cause an update of compute functions and/or content.

In the illustration, a resource provider 121 makes a request to update a resource (e.g., content and/or computer functions) of a plurality of satellite clusters at circle 1. Note that the update request may be more limited.

The provider network ground station service 115 processes this request and sends information about the update to be made to ground stations/CDN edges 111 and/or 113. In this example, this information is sent at circle 2 to the ground station/CDN edge 111. In some embodiments, the information is in the form of parcel detailing the specifics of the what is to be updated is sent such as an identifier of the resource, where the origin of resource is found, a location to store the resource in the CDNN(s), instructions to propagate, permissions for the resource, etc.

The ground station/CDN edge 111 uses this parcel to get the resource from the origin resource provider 121 (if needed) and then sends the resource to its "coupled" satellite cluster (the cluster that it can communicate with) and any other information the satellite cluster may need (such as if the resource is to be propagated and to whom, etc.) at circle 3. In this example, the satellite cluster 0 101 receives the resource and caches it (in some embodiments) at circle 4 and propagates it at circle 5 to the satellite cluster 1 103 for caching at circle 6.

In some embodiments, the ground station service 115 updates the satellite cluster 2 105 using the ground station/CDN edge 1 113 in the same manner as the ground station/CDN edge 1 111 would update the satellite cluster 1 101 at circles 7-9.

Figure 8:
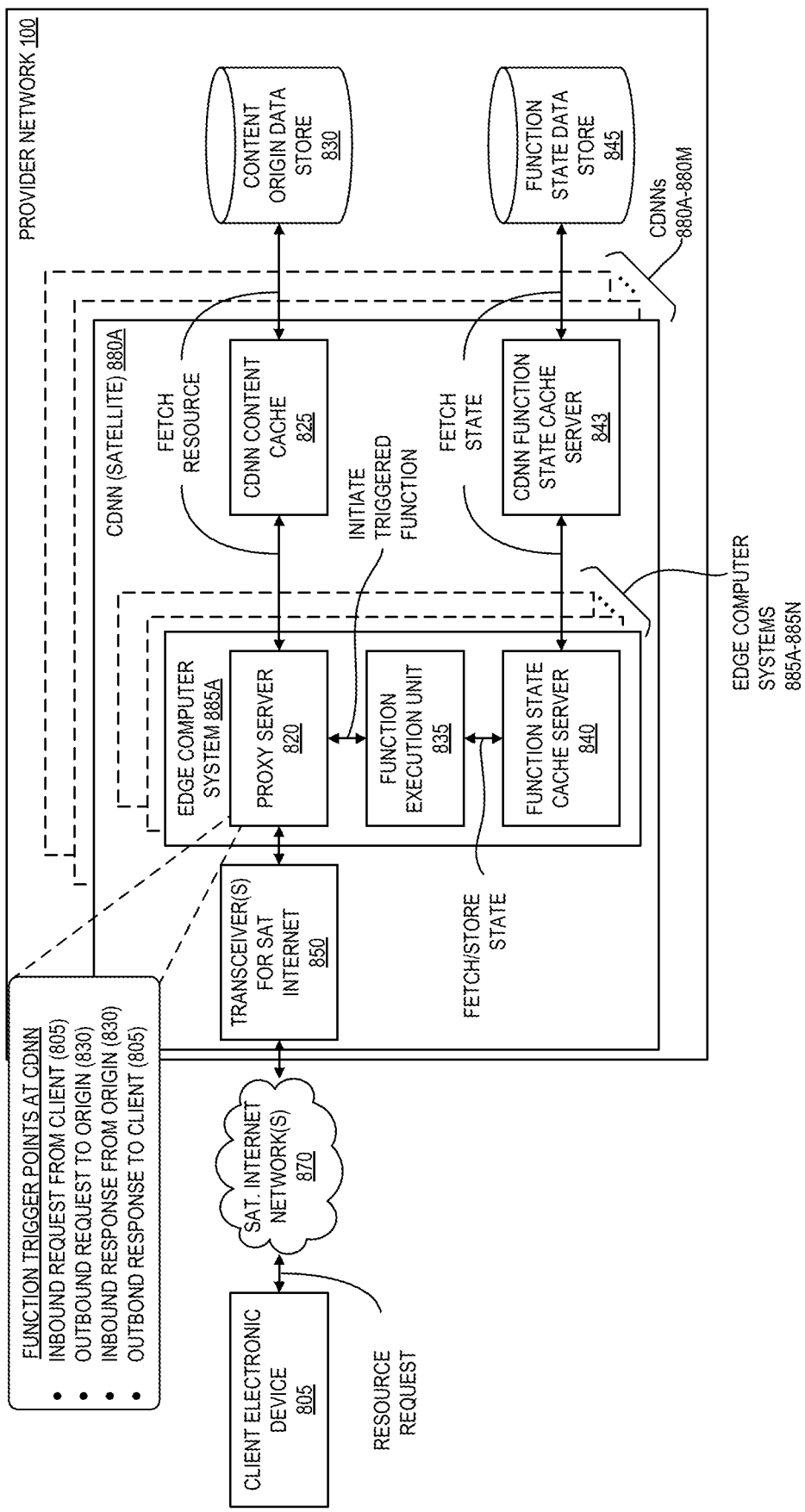
FIG. 8 is a diagram illustrating an environment for stateful computing and content serving at the edge, including in satellites, according to some embodiments.

FIG. 8 is a diagram illustrating an environment for stateful computing and content serving at the edge, including in satellites, according to some embodiments. As shown, a provider network 100 includes one or more content delivery network nodes (CDNNs) 880A to 880M to facilitate content distribution by caching content closer to end-users (e.g., the provider network 100 is operating a CDN). In particular, some of the CDNNs 880 are satellites as detailed earlier. That is, CDNNs 880 represent geographically dispersed portions of the provider network 100, each capable of serving cached content to end-user. Such content can include, for example, the web site of a customer of the operator of the provider network 100. For example, Company A can host its website—www.companya.com—with the provider network 100. content—e.g., text, images, scripts, video, markup, or other data—can be stored in a content origin data store 845. In some embodiments, the content origin data store 845 is a volume of a storage service that provides data/storage resources (e.g., object storage, block-level storage, data archival storage, databases and database tables, etc.) using non-volatile storage media such as solid-state drives (SSDs). The content origin data store 845 serves as the content source for caching by the CDNNs 880. In some embodiments, the content origin data store 845 is located within one of the CDNNs 880.

A user can initiate a request for a resource hosted by the provider network 100 by, for example, communicating with a CDNN satellite. Examples of such client electronic devices include personal computers (PCs), cell phones, handheld messaging devices, laptop computers, set-top boxes, personal data assistants, electronic book readers, wearable electronic devices (e.g., glasses, wristbands, monitors), and the like that are connected to a satellite internet service.

In this example, the proxy server 820, executed by an edge computer system 815 of a CDNN 880, receives the request from the client electronic device 805 via satellite internet network(s) 870. The CDNN 880 includes one or more transceivers to communicate with one or more of client devices, other satellites, and/or ground stations. The edge computer system 815 also includes a function execution unit 835 and a function state cache server 840. In other embodiments, one or more of the proxy server 820, the function execution unit 835, and the function state cache server 840 can be hosted by different computer systems. If hosted by a common computer system, the proxy server 820, the function execution unit 835, and/or the function state cache server 840 may execute within the same environment (e.g., operating system) or separate, virtualized environments (e.g., virtual machines, containers).

If one or more of the proxy server 820, the function execution unit 835, and the function state cache server 840 are executed within a virtualized environment with a virtual IP address, those executing within a virtualized environment may have a separate IP address even though hosted on the same underlying computer system 815A. In some embodiments, application level communications between the proxy server 820, the function execution unit 835, and the function state cache server 840 are HTTP-based. In some embodiments, communications between the proxy server 820, the function execution unit 835, and the function state cache server 840 include payloads in a binary rather than a text-based format to reduce the size of the data transfers.

Upon receiving the request for Company A's web page, the proxy server 820 obtains configuration data associated with the request. Note that since the proxy server 820 may be handling requests for many different customers of the provider network 100, there may be separate configuration data for each customer, for each resource, and/or for groups of resources. In some embodiments, the proxy server 820 fetches the configuration data from another service (not shown) within the CDNN 880. For example, the proxy server can send a message to a database frontend with the URI of the request to retrieve the associated configuration data.

The obtained configuration data includes data to locate the resource or content needed to fulfill the request from the client electronic device 805 (e.g., the location of index.html within the provider network 100). Based on the configuration data, the proxy server 820 can request the resource from a CDNN content cache 825 that is backed by the content origin data store 830 (which may be in a ground station, at an origin site, in a data center of the provider network 100, etc.). If the CDNN content cache 825 has the resource cached, it returns the resource to the proxy server 820. If not, the CDNN content cache 825 can fetch the resource from the content origin data store 830 and, once obtained, return the resource to the proxy server 820. In some embodiments, the CDNN content cache 825 may return an indication of a resource miss to the proxy server 820 to either notify the proxy server 820 that the resource is being fetched from the content origin data store 830 or so that the proxy server 820 can fetch the resource from the content origin data store 830. Once the proxy server has obtained the resource, the proxy server 820 returns the resource to the client electronic device 805 to fulfill the request. Although FIG. 1 illustrates one variant of CDNN-based resource caching and request fulfillment, other CDN architectures are possible.

The configuration data can also include one or more customer-specified functions that should be executed as part of fulfilling the request from the client electronic device 805. Functions are programs or scripts that include sets of instructions to perform various tasks. Exemplary can be compiled or interpreted at runtime. For example, functions may be specified using Python, Node.js, PowerShell, or other languages. Functions may be stateful (e.g., one or more variables associated with the function are maintained between executions) or stateless (e.g., no preservation of data between executions). Exemplary stateless functions may perform tasks such as data substitutions, image processing, or other tasks that do not require memory. Exemplary stateful functions may perform tasks such as those performed by stateless functions but further perform tasks that require memory such as tracking the number of times a particular resource is accessed, maintaining a session state in communications with the client electronic device 805, etc. For example, Company A may have specified a function that increments a counter anytime certain errors occur during the delivery of a resource.

If a function is specified, the configuration data can also include when the function should be run relative to the sequence of operations that the proxy server carries out in order to fulfill a request. For example, the customer can specify functions to be executed at one or more trigger points, such as (1) upon receipt of an inbound request from the client electronic device 805, (2) upon sending a request to fetch the resource to the function state data store 845, (3) upon receiving a response from the function state data store 845, and/or (4) upon sending a response to the client electronic device 805. Other trigger conditions may be imposed to control whether the function is triggered at the trigger point (e.g., at trigger point (1) where the inbound request was requested by a particular client electronic device 805).

If the configuration data includes a function, the proxy server 820 submits the function to the function execution unit 835 at the specified trigger point. In some embodiments, the proxy server 820 also sends the entirety of the configuration data that included the function to the function execution unit 835. In some embodiments, the function may modify the requested resource, so the proxy server 820 also sends the resource to the function execution unit 835 (e.g., the resource available at trigger points (3) or (4), above).

As the name suggests, the function execution unit 835 executes functions. In one embodiment, the function execution unit 835 is a job scheduler that receives jobs (e.g., function execution requests), executes the jobs, and returns the results. In some embodiments, the function execution unit 835 is lightweight in that it does not rely on virtualization or containerization during execution of jobs. Additional details regarding the function execution unit 835 are provided below.

The function execution unit 835 determines whether the function is a stateful function. Stateful functions may be identified with a flag in the configuration data, based on an identifier of the function, or by preprocessing the function instructions to determine whether there is a retrieval of state. Note that state generally refers to one or more variables that are maintained between executions of a function. Such state variables may be separately referenced within the function or, in some languages, referenced as part of a single state object associated with the function. If the function is a stateful function, the function execution unit 835 fetches the state associated with the function from the function state cache server 840. In some embodiments, the state object or variables are transferred in an interchange or markup format such as Extensible Markup Language (XML) or JavaScript Object Notation (JSON). The request to fetch a state associated with a function can include an identifier of the state so that the function state cache server 840 can locate the appropriate state data. Because the memory resources of the computer system hosting the function state cache server 840 are finite and the function state cache server 840 is caching the state of many functions, the function state cache server 840 is backed by a CDNN function state cache server 843, which in turn is backed by a function state data store 845 (which may be stored in a ground station, etc. like the content origin data store 830). The CDNN function state cache server 843 and/or the function state data store 845 can be volumes provided by the storage service of the provider network 100, in some embodiments. Note that the function state data store 845 can vary between customers. For example, a database hosted by the provider network 100 for one customer could be the function state data store 845 for that customer's functions. As another example, another customer could have created a service (not shown) that executes on a compute instance hosted by the provider network 100. Such a service could serve as the function state data store 845 for the other customer.

In operation, the function state cache server 840 can check whether it has cached the state associated with the function and, if so, return it to the function execution unit 835. If not, the function state cache server 840 can request the state from the CDNN function state cache server 843. The presence of the function state cache server 840 reduces a bottleneck in execution if all states had to be retrieved from the CDNN function state cache server 843. Depending on whether the CDNN function state cache server 843 has the requested state cached, it can return the state to the function state cache server 840 or fetch it from the function state data store 845. In some embodiments, the CDNN function state cache server 843 is combined with the CDNN content cache server 825. In some embodiments, the function state data store 845 is combined with the content origin data store 845. The function state cache server 840 and the CDNN function state cache server 843 may employ various caching policies to determine when to cache function states retrieved from their respective backing (e.g., evicting other states based on their last access) and to ensure consistency or eventual consistency across CDNN function state cache servers 843 within CDNNs 880.

In some embodiments, the function state cache server 840 includes a flag to limit concurrent updates. For example, the function execution unit 835 can fetch the state of function A from the function state cache server 840 as part of executing a first instance of function A. Upon sending the state to the function execution unit 835, the function state cache server 840 can lock the state by setting the flag. While executing function A, the function execution unit 835 may attempt to fetch the state of function A again as part of executing a second instance of function A. In some embodiments, the function state cache server 840 can delay fulfilling the later request of a function execution unit until an earlier request of a function execution unit returns an updated state (clearing the flag). In other embodiments, the function state cache server 840 can send an error to the function execution unit issuing the later request to cause it to retry at a later time.

Having received the state from the function state cache server 840, the function execution unit 835 executes the function. As a stateful function, the function can modify and update the state and perform other operations such as modifying the resource to be fetched from the CDNN content cache server 825 (e.g., after trigger point (1)) or to be returned to the client electronic device 805 (e.g., at trigger point (4)). The function execution unit 835 returns the result of the function execution to the proxy server 820, which can proceed with processing the request from the client electronic device 805. The function execution unit 835 also sends the updated state to the function state cache server 840 for storage.

The provider network 100 can provides a variety of types of computing-related resources such as compute resources (e.g., executing virtual machine (VM) instances and/or containers, executing batch jobs, executing code without provisioning servers) and a storage service that provides data/ storage resource as described above. To provide these and other computing-related resources, provider networks 100 often rely upon virtualization techniques. For example, virtualization technologies may be used to provide compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. For example, virtualization technologies may also be used to provide data/storage resources (e.g., a virtual volume or drive that a customer can use to store content). In some embodiments, the proxy server 820, the function execution unit 835, the function state cache server 840, the CDNN content cache server 825, the CDNN function state cache server 843, the content origin data store 845, and/or the function state data store 845 are provided by such virtualization technologies.

Although the execution of stateful functions described herein is within the context of a CDNN of a CDN, other embodiments may employ the execution of stateful functions as described herein outside of such a setting. For example, the execution of stateful functions triggered based on other network traffic besides content requests can be employed.

Figure 9:
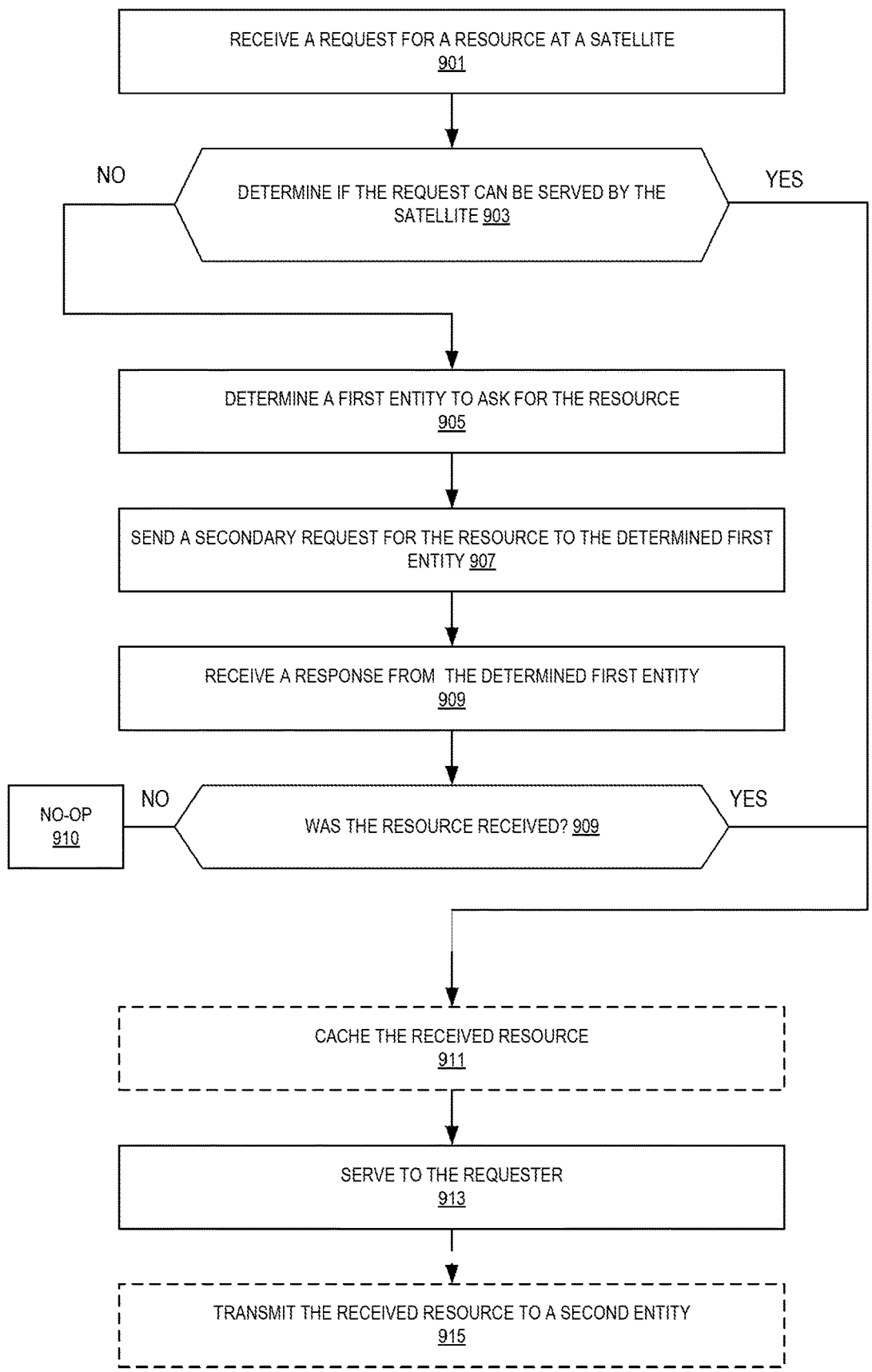
FIG. 9 illustrates embodiments of a method for handling a request for a resource at a satellite.

FIG. 9 illustrates embodiments of a method for handling a request for a resource at a satellite. Some or all of the operations of the method (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by processes or applications (e.g., proxy servers, function execution units, and function state cache servers of the other figures) running on a computer system (e.g., the edge computer systems of the other figures).

At 901, a request for a cached resource is received at a satellite. Note the satellite may be a part of a cluster of 1 or more satellites. Further, this request may be from a user (such as a person on Earth or an astronaut) or from a different satellite. Note that which satellite to receive the request may be determined by a hash function of a client device that maintains a listing of which satellites may contain the resource.

A determination is made of if the request can be served by the satellite at 903. For example, the proxy server 820 and/or function execution unit 835 determine if the resource is available.

When the resource is not available, the satellite determines a first entity to ask for the resource (or at least try to get the resource). At 905, a determination of what entity to ask for the resource is made. In particular, in some embodiments, the proxy server 820 makes this determination and can cause a "fetch" of the function or content. The entity may be one or more of a ground station or another satellite (intra-cluster or inter-cluster). For example, if the satellite that receives the request is a geo-synchronous satellite and does not have the resource, the satellite will ask for the resource from a ground station. If the satellite is a part of a cluster of satellites (such as LEO, MEO, and/or geo-synchronous), the receiving satellite may determine if it has the resource or if another satellite in its cluster or a satellite in a cluster that the receiving satellite can see has it (assuming inter-satellite communication is possible). Note that in some embodiments the resource may be found in a satellite in a different orbit type (for example, the request may be received in a LEO satellite that can see a geo-synchronous satellite that has the cached resource). Typically, whichever entity that has the resource that can be reached the quickest is the one that will be determined to ask for the resource.

A secondary request for the resource is sent to the determined first entity at 907. A response to the secondary request is received at 908. A determination of if the resource was received in the response is made at 909. If not, in some embodiments, a no-op is performed. In embodiments, the requester is alerted. In some embodiments, the request for the resource acts as a pre-fetch request. The pre-fetch may be based on similarity, previous use, or the fetching of an entire object (for example, if the resource is for a very large file the entire file may be fetched in chunks). For example, if it is typical or likely that an additional resource will be subsequently requested, the first entity may respond not only with the resource, but with that additional resource.

If it was received, in some embodiments, the received resource is cached at 911. In some instances, the resource may not be cached if it is deemed that the resource is less likely to be used than existing cached resources. Caching may include storing on a single CDNN or storing chunks comprising the resource across multiple CDNNs. Note, in some examples, an inter-cluster secondary request is serviced by a different cluster of satellites and the resource is received from that different cluster. The resource may come from an entity beyond the first entity. For example, a first entity may need to ask another entity for the resource such as a ground station which may need to ask an origin resource content provider for the resource, etc. as shown in earlier figures. Note that caching may involve removing other content using a caching scheme such as least recently used, least frequently used, etc. Further, caching a resource may include caching portions or chunks of the resource across multiple satellites.

At 913, the resource is served to the requester. In some embodiments, the received resource is transmitted to a second entity (such as another satellite cluster) at 915 for caching, etc. In some embodiments, a chunked resource is served from a plurality of satellites in a cluster that are accessible to the user.

Figure 10:
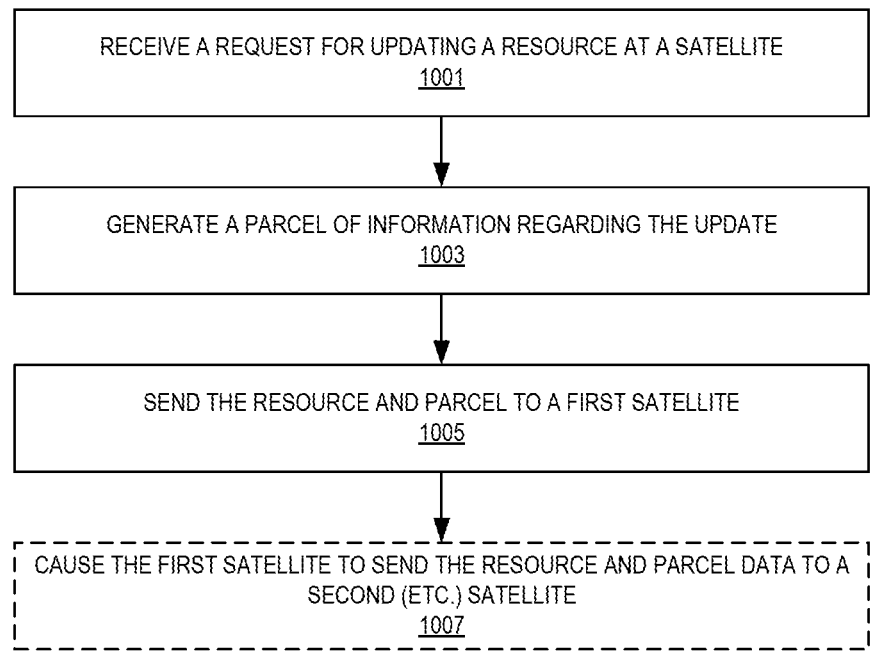
FIG. 10 illustrates embodiments of a method for updating a resource of a satellite or a cluster of satellites.

FIG. 10 illustrates embodiments of a method for updating a resource of a satellite or a cluster of satellites. Some or all of the operations of the method (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by processes or applications (e.g., proxy servers, function execution units, and function state cache servers of the other figures) running on a computer system (e.g., the edge computer systems of the other figures).

At 1001, a request for updating resource is received at a ground station service of a provider network. The request may include one or more of: a location of the resource, the resource itself (or portions thereof), where to store the resource, when to perform the update, a priority of the update, etc. This may be advantageous in many scenarios including the caching of content that it known to be popular and likely wanted by users that can communicate with a satellite.

A parcel of information is generated regarding the update at 1003. As noted above, the parcel (or other format) will tell the receiving satellite how to handle the update.

The parcel of information and resource are sent to a first satellite at 1005 for the update to be performed. Note that this first satellite may not be the end destination (the first satellite may just be a proxy). As such, in some embodiments, the parcel causes the first satellite to send the resource and parcel data to a second, etc. satellite at 1007.

Figure 11:
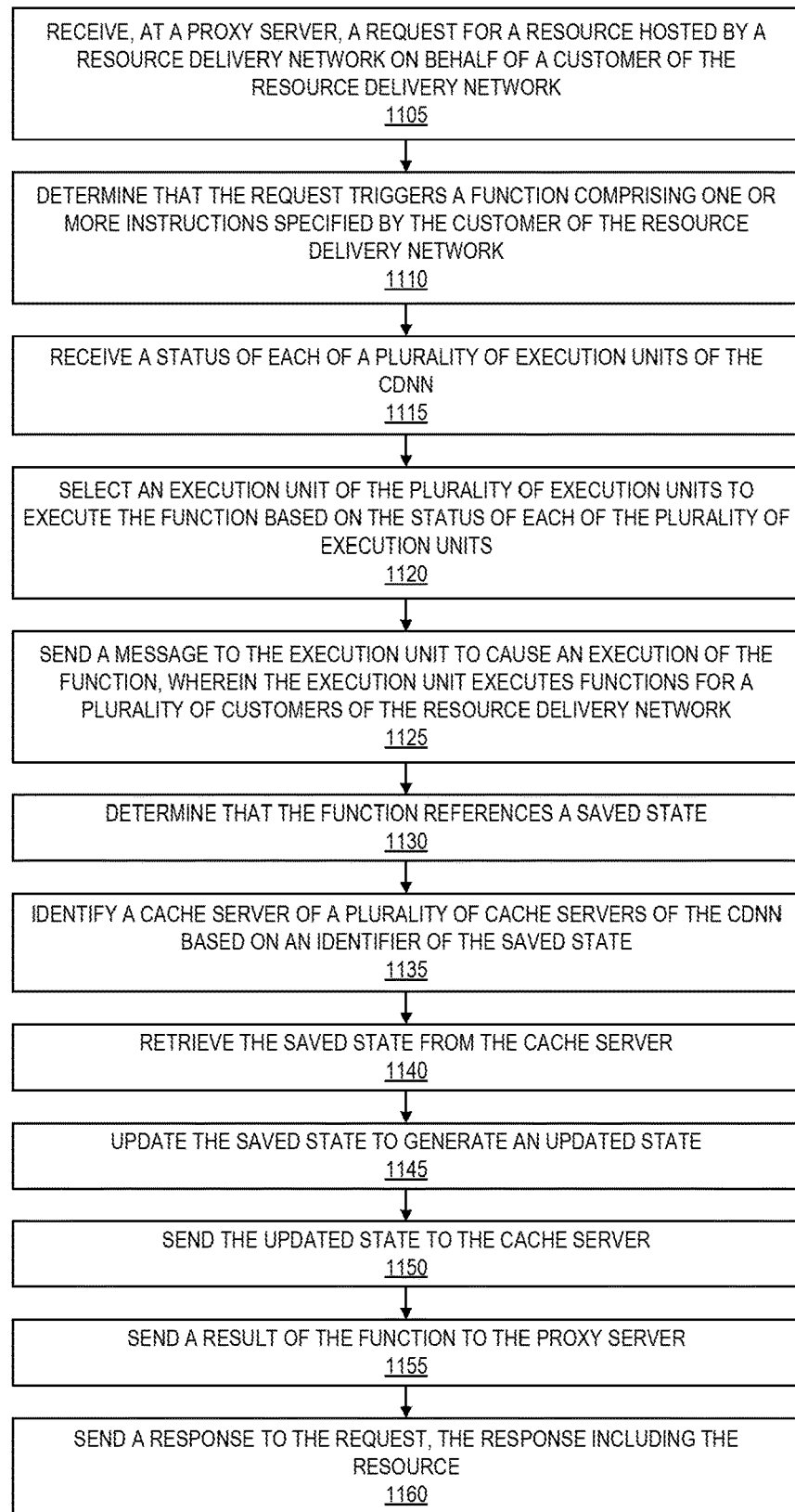
FIG. 11 is a flow diagram illustrating operations of a method for stateful computing at the edge according to some embodiments.

FIG. 11 is a flow diagram illustrating operations of a method for stateful computing at the edge according to some embodiments. Some or all of the operations of the method (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by processes or applications (e.g., proxy servers, function execution units, and function state cache servers of the other figures) running on a computer system (e.g., the edge computer systems of the other figures).

The operations include, at block 1105, receiving, at a proxy server, a request for a resource hosted by a content delivery network on behalf of a customer of the content delivery network. As described herein, a CDNN of the CDN can have proxy servers that handle the retrieval of content or resources hosted on behalf of customers in response to requests. For example, a proxy server might fetch a replica of a web page to deliver in response to a request to get the web page. As shown in FIG. 1, each CDNN may include many different proxy servers running on different computer systems of the CDNN.

The operations further include, at block 1110, determining that the request triggers a function comprising one or more instructions specified by the customer of the content delivery network. As described herein, some CDNs permit customers to specify functions to be executed as part of the delivery of content or resources of the customer. In handling a request, a proxy server can trigger a function at certain points, such as upon receiving the request, upon sending a request to fetch the requested content, upon receiving the requested content, or upon sending the requested content to the origin of the request, for example. Such functions may be stateless or stateful, the latter preserving one or more variables of the function between separate executions of the function.

The operations further include, at block 1115, receiving a status of each of a plurality of execution units of the point of presence. As described herein, execution units execute the functions specified by customers of the CDN. To share the compute resources of each of the execution units when distributing functions for execution, execution units can send status information to proxy servers within the CDNN. Such status information may include the fill level of queue of functions at the execution unit, whether such a queue of functions is full, the level of processor utilization by the execution unit, etc.

The operations further include, at block 1120, selecting an execution unit of the plurality of execution units to execute the function based on the status of each of the plurality of execution units. The proxy server can select from the available execution units of the CDNN based on the status of the execution units to avoid delays associated with executing the function (e.g., if one execution unit has a sizable queue of pending functions for execution and another has none). Note that the selected execution unit may be executing on the same or a different underlying computer system as the proxy server. To facilitate communications between the proxy servers and the execution units of the CDNN, each of the proxy servers can send messages to each of the execution units. For example, each of the proxy servers and each of the execution units can vend a network-addressable interface (e.g., a web server) to the other components of the CDNN.

The operations further include, at block 1125, sending a message to the execution unit to cause an execution of the function, wherein the execution unit executes functions for a plurality of customers of the content delivery network, and wherein the message includes the function. As described above, the proxy server can send a function execution request to the execution unit. Note that depending on whether the function is triggered after receiving the requested content or resource, the message may further include the content or resource.

The operations further include, at block 1130, determining that the function references a saved state. As described herein, some functions may be stateless while others are stateful. The execution unit can either pre-process the function to determine whether state is referenced to pre-fetch state or execute the function and carry out state retrieval operations when they are encountered. The state of a function may be referenced as a single state object that includes one or more variables or as individual variables of the function.

The operations further include, at block 1135, identifying a cache server of a plurality of cache servers of the point of presence based on an identifier of the state. As described herein, in some embodiments, the memory required to cache states within a CDNN is distributed using a hash map that associates certain states with certain cache servers. Based on a hash of, for example, an identifier of the state, the execution unit can identify which cache server is responsible for caching the function's state. Note that the cache server may be executing on the same or a different computer system as one or both of the proxy server and the execution unit. Like the proxy servers and execution units, the cache servers, the cache servers can vend a network-addressable interface (e.g., a web server) to the other components of the CDNN.

The operations further include, at block 1140, retrieving the saved state from the cache server, at block 1145, updating the saved state to generate an updated state, and at block 1150, sending the updated state to the cache server. During function execution, the execution unit performs the instructions of the function, which, for stateful functions, include updating the function's state.

The operations further include, at block 1155, sending a result of the function to the proxy server. The result may be an indication that the function has completed or a processed component of the message to execute the function from the proxy server. For example, if the message at block 1125 included the content or resource being requested, the function may modify and return the content or resource to the proxy server.

The operations further include, at block 1160, sending a response to the request, the response including the resource. As described herein, the response can include the content or resource requested at block 1105, which may have been modified by the execution of the function.

Figure 12:
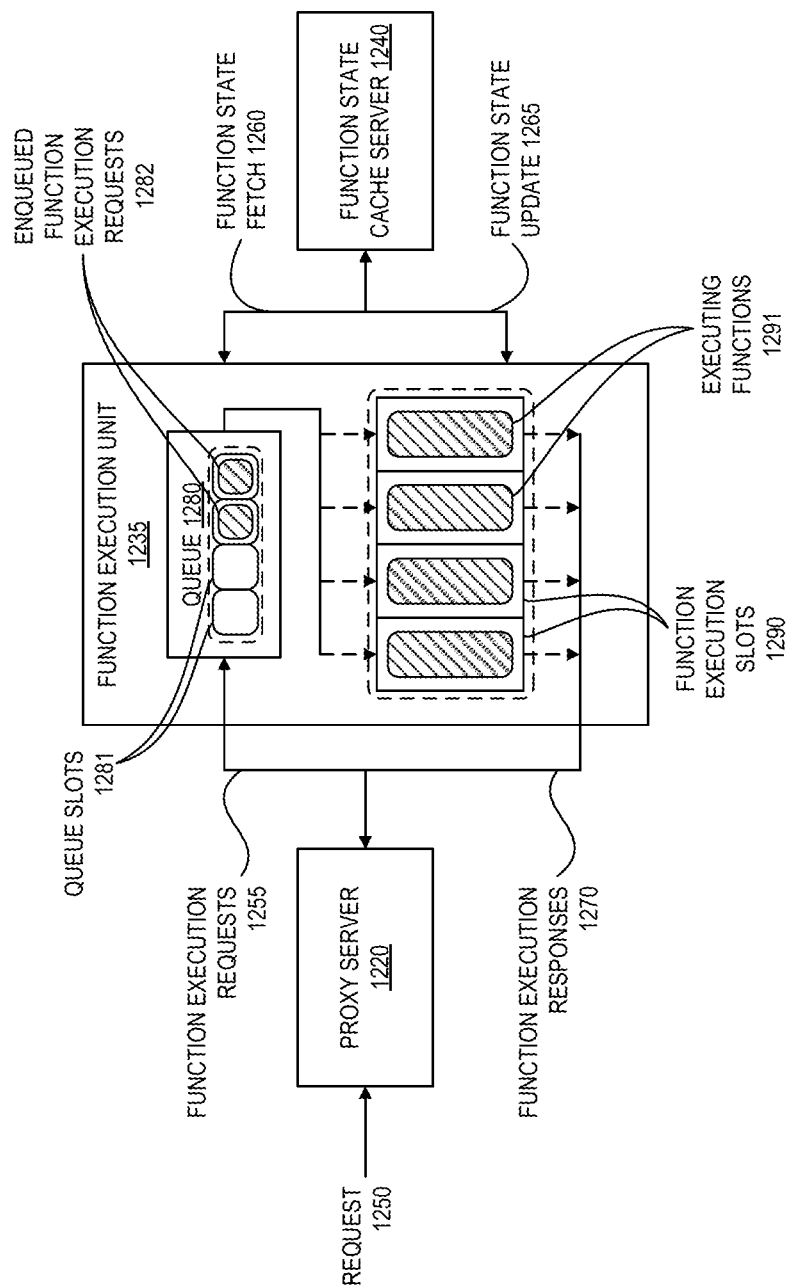
FIG. 12 is a diagram illustrating a message flow for stateful computing in a CDNN according to some embodiments.

FIG. 12 is a diagram illustrating a message flow for stateful computing in a CDNN according to some embodiments. At a high level, a proxy server 1220 (e.g., the proxy server 820 of FIG. 8) receives a request 1250 for a resource (e.g., from a client electronic device). The proxy server 1220 evaluates the request against configuration data, as described above, and, if a function is triggered, issues a function execution request 1255 to a function execution unit 1235 (e.g., the function execution unit 835 of FIG. 8). As part of handling a stateful function, the function execution unit 1235 sends a request 1260 to fetch the function's state from a function state cache server 1240 (e.g., the function state cache server 840 of FIG. 8). As further part of handling the stateful function, the function execution unit 1235 sends a request 1265 to update the function's state with the function state cache server 1240. As further part of handling the stateful function, the function execution unit 1235 sends a function execution response 1270 that includes the result of the function execution to the proxy server 1220.

In some embodiments, the request 1250 includes an identifier of the requested resource (e.g., a URI to content) and an identifier of the source of the request (e.g., the client electronic device 805).

In some embodiments, the function execution request 1255 includes the function or an identification of the function to be executed. The function execution request 1255 may further include a request identifier to later be referenced in the function execution response 1270. In some embodiments, the function to be executed is included in the configuration data, described above, and the function execution request 1255 includes the configuration data. If the function is triggered after obtaining the requested resource (e.g., at trigger points (3) or (4), above), the function execution request 1255 can further include the resource so that during execution the function has access to the resource (e.g., to modify it).

In some embodiments, the request 1260 to fetch the state includes an identifier of the state. For example, when a customer creates a stateful function, a service of the provider network 100 can assign a state associated with the function a unique identifier. In some embodiments, the identifier is a combination of one or more of a customer identifier that uniquely identifier the customer, a function identifier that uniquely identifies the function, and a state identifier that uniquely identifies a state (e.g., Customer_ID.State_ID). If state variables are separately referenced within a function, the identifier can specify which state variable is being requested (e.g., Customer_ID.Variable_ID). In some embodiments, the customer can reference the identifier in other functions. In some embodiments, the function execution unit 1235 can derive an index from the identifier included with the request 1260, such as by hashing the identifier, to send to the function state cache server 1240.

In some embodiments, the request 1265 to update the state includes the updated state and the identifier of the state to allow the function state cache server 1240 to update the state.

In some embodiments, the function execution response 1270 includes an indication that the function execution is complete and may include the request identifier included with request 1255. Additionally, if the function created or modified the content or resource to be sent in response to the request 1250, the function execution response 1270 includes such content or resource.

Messaging may be synchronous or asynchronous. In the synchronous case, the requestor can wait for a response that includes the requested data. For example, the function execution unit 1235 can send a request for a function's state to the function state cache server 1240 and wait for a response from the function state cache server 1240 that includes the function's state. Such a scenario might limit performance based on a cap on the number of outstanding requests or other limit and the time it takes to receive the response (e.g., the function execution unit 1235 has to wait for the function state cache server 1240 to fetch a state from a CDNN function state cache server (not shown) in the case of a miss). In the asynchronous case, the message can be assigned an identifier and, sometime later, a response that references the identifier can be sent that includes the requested data. The sender and recipients can track pending requests using the identifier. For example, the function execution unit 1235 can send a request for a function's state to the function state cache server 1240 which assigns an identifier to the request and returns the identifier to the function execution unit 1235. Sometime later the function state cache server 1240 can send a message that includes message identifier and the requested the function's state.

In some embodiments, the function execution unit 1235 includes a queue 1280. As illustrated, the queue 1280 includes four queue slots 1281, two of which are filled with function execution requests 1282. The function execution unit 1235 further includes a plurality of function execution slots 1290. In some embodiments, the function execution unit 1235 is a multi-threaded application and the slots 1290 correspond to the number of threads the function execution unit 1235 can spawn. As shown, the function execution unit 1235 includes four slots 1290, each of which is indicated as executing a function 1291. As executing functions 1291 complete, the function execution unit 1235 begins executing the next enqueued function execution request 1282. Note that both the enqueued function execution requests 1282 and the executing functions 1291 may be functions of many different customers of the provider network.

Figure 13:
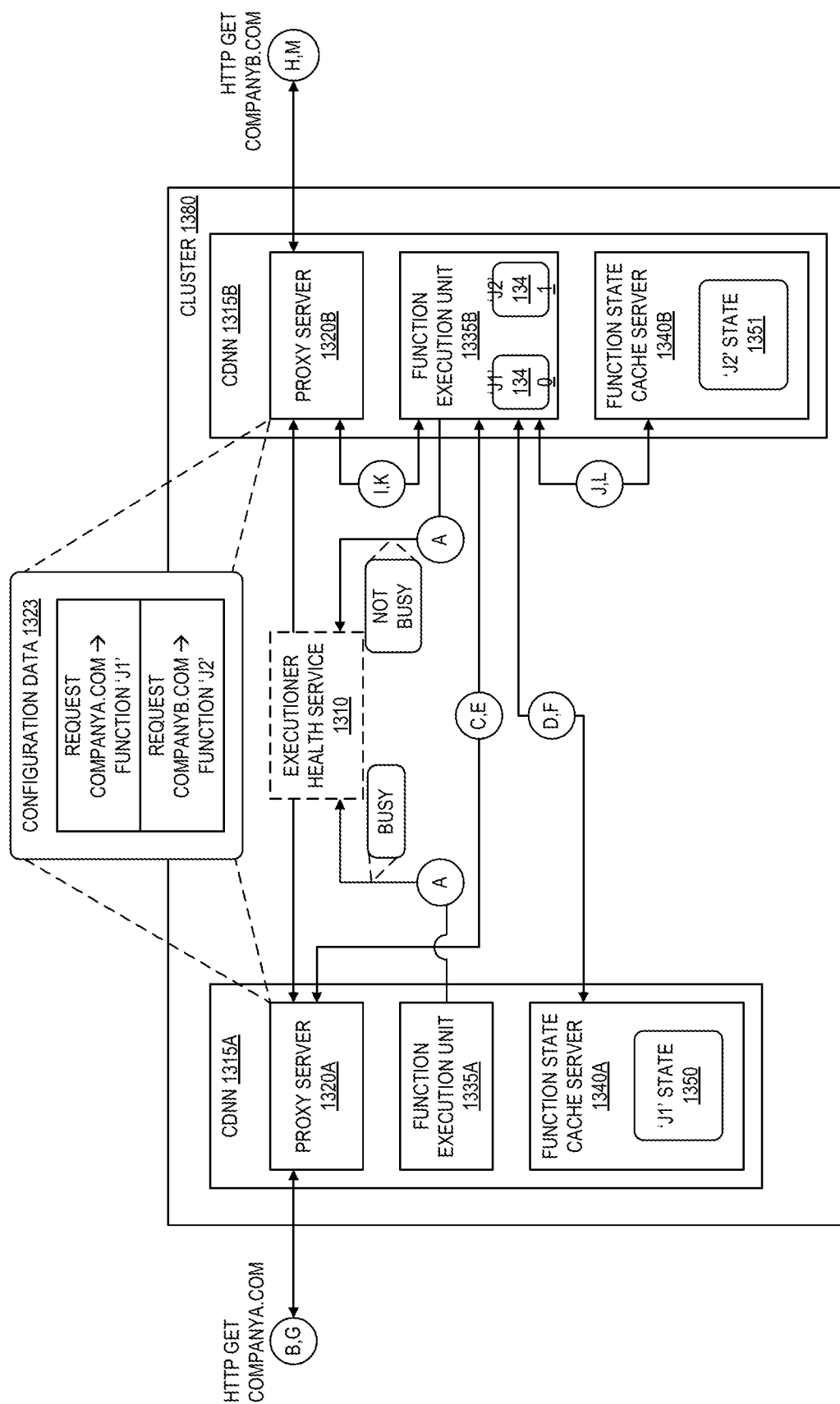
FIG. 13 is a diagram illustrating another environment for stateful computing using CDNNs in a cluster according to some embodiments.

FIG. 13 is a diagram illustrating another environment for stateful computing using CDNNs in a cluster 1380 according to some embodiments. The CDNNs 1315A, 1315B respectively include proxy servers 1320A, 1320B (e.g., proxy servers 820), function execution units 1335A, 1335B (e.g., function execution units 835), and function state cache servers 1340A, 1340B (e.g., function state cache servers 840). As described above, each of the proxy servers 1320, function execution units 1335, and function state cache servers 1340 can be separately addressable on a network of the CDNN 1380 by an IP address or an IP address and port number. In this manner, the communications amongst the proxy servers 1320, function execution units 1335, and function state cache servers 1340 can be considered a mesh network. Such an interconnection allows the resource requirements of stateful computing at the edge to be distributed amongst computer systems of the CDNN so that a given CDNN 1315 is not subject to a high compute load while CDNN 1315 is subject to a relatively low compute load. Furthermore, state can be stored in a distributed manner to limit the amount of churn amongst the function state cache servers 1340 and between the function state cache servers 1340 and a CDNN function state cache server (not shown).

The function execution units 1335 send their status to the proxy servers 1320 so that the proxy servers 1320 can intelligently dispatch function execution requests. The status may be specified in a number of ways. For example, the status may be a percentage CPU utilization, a number of idle execution slots such as the above-described function execution slots, number of available queue slots such as the above-described queue slots 1381, etc. In some embodiments, the status may be a simple busy/not busy indicator (as shown) that indicates whether the function execution unit 1335 can accept another function execution request. The function execution units 1335 may periodically send their status information or send it once their utilization has reached some threshold (e.g., 90% CPU, full queue, etc.).

In some embodiments, the function execution units 1335 directly send their status to the proxy servers 1320. That is, each function execution unit 1335 sends its status to each of the proxy servers 1320 (e.g., the function execution unit 1335A sends status data to the proxy servers 1320A, 1320B). In other embodiments, the function execution units 1335 indirectly send their status to the proxy servers 1320 via an executioner health service 1310 (hosted on a CDNN). The executioner health server 1310 may be an application hosted on a computer system of the cluster 1380 that aggregates the received status information and distributes it to the proxy servers 1320. Such aggregation limits the amount of message traffic amongst the function execution units 1335 and the proxy servers 1320 so that each function execution unit 1335 sends one status message to the executioner health service 1310 and each proxy server 1320 receives only one status message from the executioner health service 1310.

Based on the received status data, the proxy servers 1320 can select a function execution unit 1335 to execute a triggered function based on some policy. If the status data is binary (e.g., busy or not busy), the policy can be a round-robin or random selection from those function execution units 1335 that are not busy. If a more granular form of status data is sent, the policy can select a least busy function execution unit 1335 (e.g., where least is defined as the one with the fewest queued function execution requests, lowest CPU utilization, etc.). Once a proxy server 1320 has selected a function execution unit 1335, the proxy server 1320 can send a function execution request (e.g., the request 1255).

As part of executing a function, the function execution unit 1335 can check whether the function is stateful and, if so, fetch the associated state(s). As described above, the state of a function may be referenced by an identifier (e.g., Customer_ID.State_ID, Function_ID.Variable_ID). The function execution unit 1335 can locate a state by applying a hash function to at least a portion of the identifier, in some embodiments. In particular, the function execution unit 1335 can derive a hash from the identifier and, based on a hash table or map that relates hashes to function state cache servers 1340, determine which of the function state cache servers 1340 cache the state data. This allows the available memory resources of all of CDNNs 1315 to be pooled (e.g., if the CDNN includes ten function state cache servers 1340 and there are 1000 states, each function state cache server can be responsible for managing a cache for 100 states). In some embodiments, a consistent hashing mechanism is employed to limit the amount of remapping of state data amongst function state cache servers 1340 as they come online or go offline. Once the function execution unit 1335 has identified the function state cache server 1340 responsible for caching the function's state, the function execution unit 1335 can send a message to the function state cache server 1340 fetch the function's state (e.g., the request 1260). Upon receipt of a request for a function's state, the function state cache server 1340 reads the state from memory on the hosting CDNN 1315 if the state is cached or from a memory backing if the state is not presently cached (e.g., the function state cache server 843) and sends the state to the requesting function execution unit 1335.

In some embodiments, the function execution unit 1335 pre-fetches state, for example, when a function is queued for execution to reduce the execution time of the function by eliminating the delay associated with messaging between the function execution unit 1335 and the function state cache server 1340.

An example sequence of operations is described with reference to the encircled letters 'A' through 'M'. In this example, the provider network is hosting two websites: companya.com and companyb.com. Configuration data 1323 indicates a stateful function 'J1' is to be executed upon the request of companya.com and a stateful function 'J2' is to be executed upon the request of companyb.com. The function state cache server 1340A stores J1's state 1350 and the function state cache server 1340B stores J2's state 1351.

At circle 'A', the function execution units 1335 send their status either directly to the proxy servers 1320 or indirectly via an executioner health service 1310. As shown, the function execution unit 1335A has provided a busy indication, and the function execution unit 1335B has provided a not busy indication (which may be omitted, if, for example, proxy servers default to assuming a silent function execution unit 1335 is available).

In processing a request for companya.com, the proxy server 1320A receives a request (e.g., request 1150) to retrieve the website (e.g., index.html) as indicated at circle 'B'. Based on the configuration data 1323, the proxy server 1320A determines that function 'J1' is to be executed upon receiving a request for companya.com. Since the function execution unit 1335A has provided a busy indication, the proxy server 1320A selects the function execution unit 1335B and sends a message to the function execution unit 1335B to execute the function (e.g., request 260), as indicated at circle 'C'. The function execution unit 1335B identifies function 'J1' as a stateful function and determines that the state of function 'J1' is cached by the function state cache server 1340A (e.g., based on the hashing described above). The function execution unit 1335B fetches the state of function 'J1' by sending a request (e.g., request 1160) to the function state cache server 1340A, as indicated at circle 'D'. The function execution unit 1335B executes the function and returns a result (e.g., response 1170) and updates the function's state (e.g., request 1165) as indicated at circles 'E' and 'F', respectively. Upon receiving the result, the proxy server 1320A sends the requested website to the requestor, as indicated at circle 'G'.

In processing a request for companyb.com, the proxy server 1320B receives a request (e.g., request 1250) to retrieve the website (e.g., index.html) as indicated at circle 'H'. Based on the configuration data 1323, the proxy server 1320B determines that function 'J2' is to be executed upon receiving a request for companyb.com. Since the function execution unit 1335A has provided a busy indication, the proxy server 1320B selects the function execution unit 1335B and sends a message to the function execution unit 1335B to execute the function (e.g., request 1160), as indicated at circle 'I'. The function execution unit 1335B identifies function 12' as a stateful function and determines that the state of function 'J2' is cached by the function state cache server 1340B (e.g., based on the hashing described above). The function execution unit 1335B fetches the state of function 'J1' by sending a request (e.g., request 1160) to the function state cache server 1340B, as indicated at circle 'I'. The function execution unit 1335B executes the function and returns a result (e.g., response 1170) and updates the function's state (e.g., request 1165) as indicated at circles 'K' and 'L', respectively. Upon receiving the result, the proxy server 1320B sends the requested website to the requestor, as indicated at circle 'M'.

Figure 14:
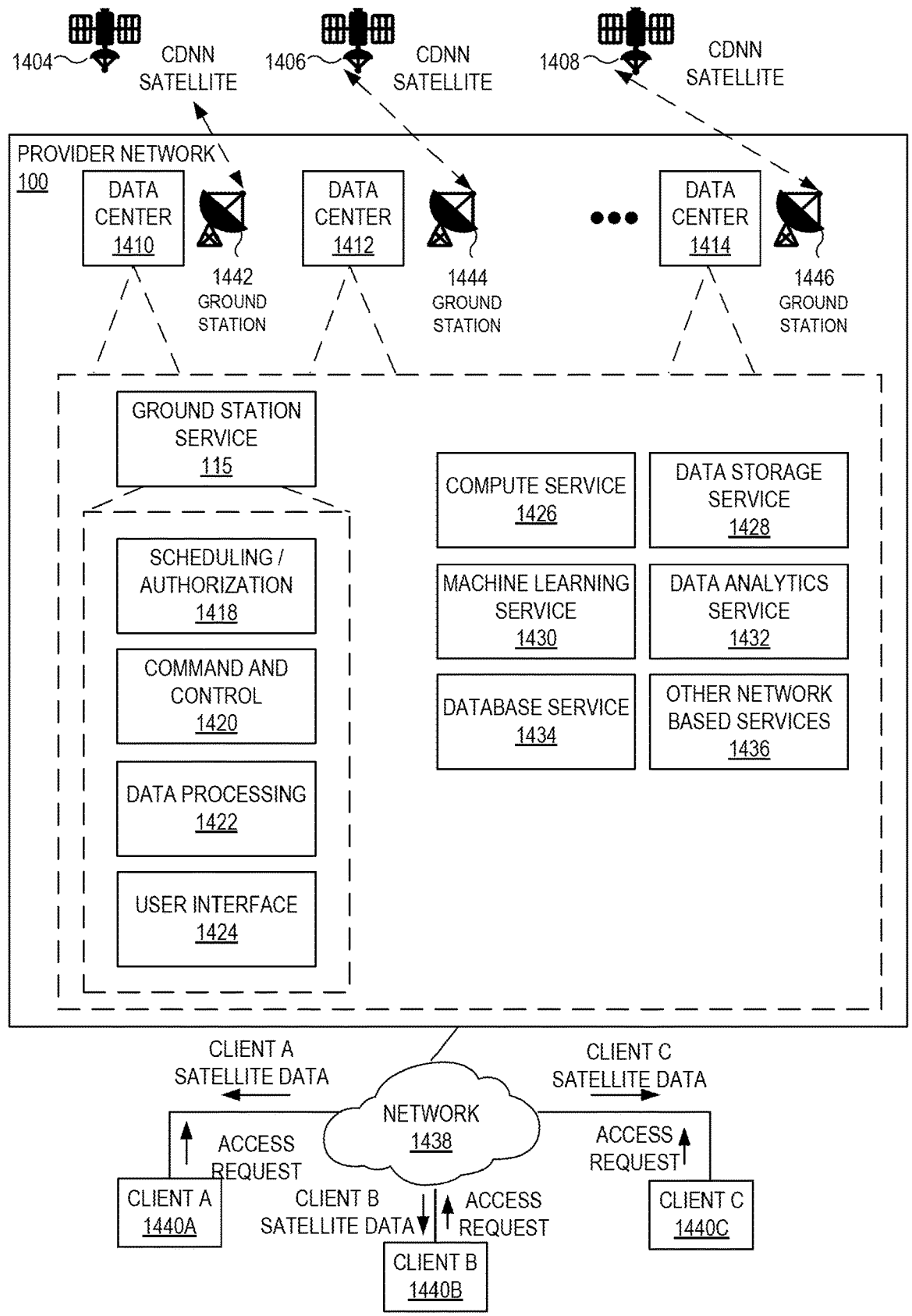
FIG. 14 illustrates a ground station and a ground station service of a provider network comprising data centers with associated satellite antenna ground stations, wherein the provider network offers a satellite antenna ground station service to clients, according to some embodiments.

FIG. 14 illustrates a ground station and a ground station service of a provider network comprising data centers with associated satellite antenna ground stations, wherein the provider network offers a satellite antenna ground station service to clients, according to some embodiments.

Provider network 100 includes data center 1410 and associated ground station 1442, data center 1412 and associated ground station 1444, and data center 1414 and associated ground station 1446. In some embodiments, a provider network, such as provider network 100, may include additional data centers and associated ground stations. Provider network 100 is also connected to client A 1440A, client B 1440B, and client C 1440C via network 1438. In some embodiments, a provider network, such as provider network 100, may be connected to any number of clients and a satellite antenna ground station service of the provider network, such as ground station service 115 may provide satellite antenna ground station services to any number of clients of the provider network. For example, provider network 100 is also capable of making contacts with CDNN satellites owned by or operated by clients A-C 1404-1408 via satellite antennas at ground stations 1442, 1444, and 1446 of ground station service 115.

In some embodiments, data downlinked from a client satellite by a satellite antenna ground station service may be provided to, and/or stored in, a data center associated with a ground station of the satellite antenna ground station service. For example, data downlinked from CDNN satellite 1404 may be made available to, and/or stored in, data center 1410. Additionally, in some embodiments, each data center of a provider network may be connected to other ones of the data centers of the provider network via high-speed network connections of the provider network. For example, data centers 1410, 1412, and 1414 may be connected to one another via high-speed network connections of provider network 100. Thus, any client of a satellite antenna ground station service with access to a provider network that includes a satellite antenna ground station service, for example via an internet connection to the provider network, may access data downlinked from the client's satellite. Moreover, in some embodiments, the client may access the downlinked data using high-speed network connections of the provider network from remotely located data centers such that data access latency from the perspective of the client is not significantly different as compared to if the data was accessed from a locally situated data center. Additionally, in some embodiments, downlinked client data may be relocated to a data center proximate to the client and/or consolidated in a data center proximate to a client from a plurality of data centers. For example, downlinked data may be collected using corresponding satellite antennas ground stations associated with a plurality of data centers and transmitted over high-speed network connections of a provider network such that the downlinked data is consolidated at one or more data centers.

Additionally, computing devices, such as storage servers, compute servers, networking devices, etc. of a provider network, such as provider network 100, may implement a plurality of other provider network services. For example, the dotted line box shown in FIG. 14 illustrates a logical view of services that may be offered by provider network 100 using physical hardware located in data centers 1410, 1412, 1414, etc. In some embodiments, in addition to ground station service 115, a provider network may also offer a compute service 1426, wherein the compute service implements virtualized compute instances that are allocated to clients of the compute service, and wherein the virtualized compute instances are implemented using physical computing devices included in the data centers 1410, 1412, 1414, etc. In some embodiments, a provider network, such as provider network 100, also offers a data storage service, such as data storage service 1428. In some embodiments, a data storage service may be any one of various types of data storage services, such as a block-based storage service that provides block-storage resources to compute instances of a compute service, such as compute service 1426. Also, in some embodiments, a data storage service, may be an object-based storage service that stores data objects, such as downlinked satellite data, on behalf of clients, or may be a cold storage service that provides a low-cost storage solution for infrequently accessed data objects, such as downlinked satellite data.

In some embodiments, a provider network, such as provider network 100 also includes a machine learning service, such as machine learning service 1430. In some embodiments, a machine learning service may apply machine learning techniques to downlinked satellite data, such as may be stored in data storage service 1428. In some embodiments, a provider network, such as provider network 100, may further include a data analytics service, such as data analytics service 1432. In some embodiments, a data analytics service may perform data analysis operations on downlinked satellite data, and/or other data stored in a data storage service of a provider network. For example, in some embodiments, a data analytics service may compare data collected from other sources with downlinked satellite data to perform data analysis.

In some embodiments, a provider network, such as provider network 100, may further include a database service, such as database service 1434. In some embodiments, one or more databases managed by database service 1434 may be at least partially populated with satellite downlink data received from a client satellite, wherein the populated database is made available to the client. Also, in some embodiments, a provider network, such as provider network 100, may provide a plurality of other network-based services, such as other network-based services 1436, which may be used to analyze, manipulate, store, etc. satellite downlink data received from a client's satellite. For example, in some embodiments, other network-based services 1436 may include an elastic map reduce service, a query service, multiple types of machine learning services (in addition to, or as a part of, machine learning service 1430), an encryption key management service, a software development kit service, a networking service, a mobile communication service, an internet of things (IoT) service, a security service, an enterprise application, etc.

In some embodiments, a satellite antenna ground station service, such as ground station service 115, implements a user interface, such as user interface 1424. In some embodiments, a client may verify ownership or authority over a satellite by submitting identifying credentials to the satellite service via the user interface. In some embodiments, a scheduling/authorization component, such as scheduling/authorization component 1418, may verify the client's ownership of a satellite or the client's authority in regard to the satellite. Once a client is authorized for a given client satellite, the client may submit a request for a satellite antenna access time-slot for a contact session with the client's satellite for which the client has been authorized. For example, clients A-C submit access requests to ground station service 115 via network 1438 and user interface 1424 of ground station service 115. In some embodiments, a user interface of a satellite antenna ground station service, such as user interface 1424, may be a web-based graphical user interface, wherein a client submits a satellite antenna access time-slot request via the graphical user interface. In some embodiments, a user interface of a satellite antenna ground station service, such as user interface 1424, may be an application programmatic interface (API), wherein a client programmatically submits a request for a satellite antenna access time-slot via the API of the satellite antenna ground station service.

In some embodiments, a satellite antenna ground station service scheduling/authorization component may reserve a time-slot on a satellite antenna of the satellite antenna ground station service in response to receiving a request from a client of the satellite antenna ground station service. In some embodiments, a client of a satellite antenna ground station service may indicate, in a request, a desired ground station location, a desired time-slot, a satellite to be contacted during the satellite antenna access time-slot, and/or additional information about the requested satellite antenna access time-slot. In some embodiments, a scheduling/authorization component of a satellite antenna ground station service, such as scheduling/authorization component 1418 of ground station service 115, may match requested time-slots, requested ground stations, etc. with available time-slots on satellite antennas of ground stations included in the satellite antenna ground station service.

In some embodiments, a scheduling/authorization service, such as scheduling/authorization component 1418, may apply one or more prioritization factors to determine a priority for clients requesting conflicting time-slots. For example, some client applications may not be materially affected by using a different ground station than a requested ground station while others may be, or some clients may not specify a requested ground station location. In such situations, a scheduling/authorization component, such as scheduling/authorization component 1418, may prioritize requests from clients that are impacted by ground station location over requests from clients that are less impacted by changing a ground station location when requests for a same ground station during a same time-slot are conflicting. Also, in a similar manner, a scheduling/authorization component, such as scheduling/authorization component 1418, may apply one or more prioritization factors to resolve conflicting requests based on time. For example, some client applications may be sensitive to time delays, whereas other client applications may be less sensitive to time delays. In such situations, a scheduling/authorization component, such as scheduling/authorization component 1418, may prioritize time-sensitive requests ahead of other requests.

In some embodiments, a scheduling/authorization component may operate according to a first come/first served model, wherein time-slot reservations are provided to clients from a stock of remaining available time slots at ground stations included in the satellite antenna ground station service based on an order in which the requests are received.

In some embodiments, a scheduling/authorization component may operate according to a hybrid model, wherein time-slot reservations are provided to clients from a stock of remaining available time slots at ground stations included in the satellite antenna ground station service based on an order in which the requests are received with exceptions made for certain classes of sensitive requests that may be time-sensitive or ground station location-sensitive.

In some embodiments, a satellite antenna ground station service integrates a satellite and/or antenna control plane and data plane into a provider network service, such as a satellite antenna ground station service. For example, in some embodiments a satellite antenna ground station service, such as ground station service 115, includes a command and control component and a data processing component, such as command and control component (control plane) 1420 and data processing component 1422. In some embodiments, a client of a satellite antenna ground station service may remotely control one or more parameters of a ground station and/or the client's satellite via a command and control component, such as command and control component 1420. For example, a client may interact with a command and control component via a user interface of a satellite antenna ground station service, such as a web-based graphical user interface or an API to the satellite antenna ground station service, such as user interface 1424.

In some embodiments, a command and control component, may be implemented using a compute instance of a compute service, such as a compute instance provided by compute service 1426, wherein the compute instance is allocated for the purpose of instantiating a command and control instance. In a similar manner, a data processing component, may be implemented using a compute instance of a compute service, such as a compute instance provided by compute service 1426, wherein the compute instance is allocated for the purpose of instantiating a data processing component.

In some embodiments, session instances such as a command and control instance and a data processing instances may be instantiated prior to a reserved time-slot reserved for a client. Thus, the command and control instance and the data processing instance may be ready to downlink or uplink data to a client satellite at the beginning of a reserved time-slot without requiring configuration delays to configure a command and control component or a data processing component after the beginning of the reserved time-slot. Also, in some embodiments, configurations for a command and control component and a data processing component for a particular client may be stored by a satellite antenna ground station service and may be used to instantiate command and control instances and/or data processing instances for future time-slots reserved for the client.

In some embodiments, session instances, such as a command and control instance and a data processing instance may be implemented on computing resources of a data center attached to, or associated with, a ground station at which a client has a reserved time-slot for satellite antenna access. Thus, data downlinked from the client's satellite during the access time-slot via a satellite antenna of the satellite antenna ground station service may be locally processed at an attached data center via a data processing instance implemented at the attached data center. In a similar manner, a locally implemented command and control instance may be implemented at a data center attached to a satellite antenna allocated to a client during a reserved time-slot of satellite antenna access.

In some embodiments, ground stations of a satellite antenna ground station service, such as ground stations 1442, 1444, and 1446, include one or more satellite antennas, software defined radios, and modems to communicate with satellites using radio signals. In some embodiments, a ground station may receive data downlinked from a client satellite, monitor health and status of client satellite, provide commands to the client satellite to perform tasks, such as take a picture, or transmit television, voice, or radio signals to customers on earth, as an example. In some embodiments, a ground station may include redundant components such as a primary and secondary antenna, software defined radio, modem, etc.

In some embodiments, a user interface of a satellite antenna ground station service, such as user interface 1424, may include one or more APIs that function as endpoints that allow programmatic integration of a satellite antenna ground station service into existing satellite operation systems. In some embodiments, a satellite antenna ground station service may further relay communications using a satellite owned or operated by the satellite antenna ground station service to other ground stations. For example, a satellite antenna ground station service may downlink data from a client satellite and then relay the downlinked data to another ground station via a geosynchronous satellite operated by the satellite antenna ground station service.

Figure 15:
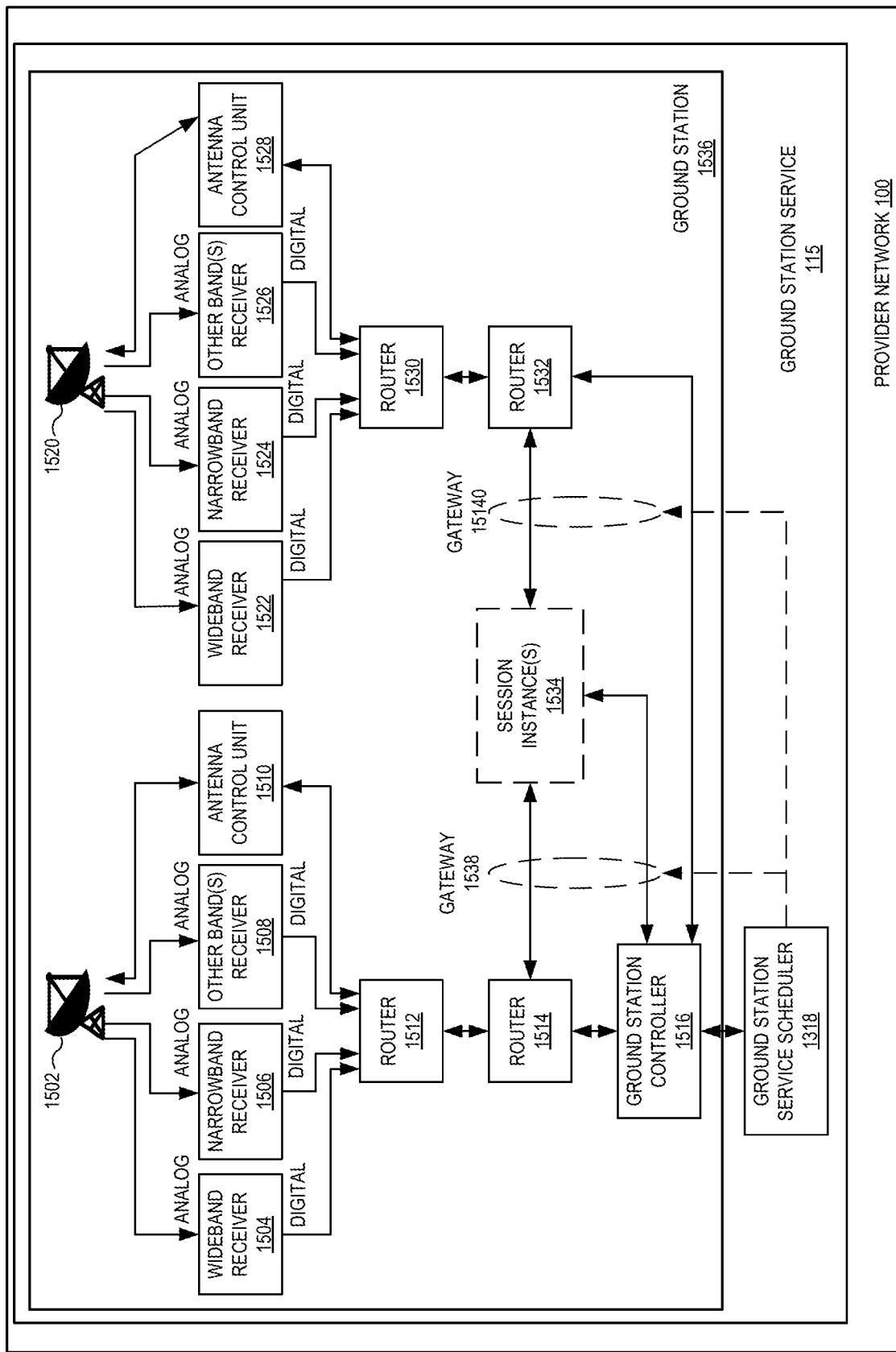
FIG. 15 illustrates a more detailed view of a ground station included in a satellite antenna ground station service, according to some embodiments.

FIG. 15 illustrates a more detailed view of a ground station included in a satellite antenna ground station service, according to some embodiments.

In some embodiments, a ground station of a satellite antenna ground station service included in a provider network, such as ground station 1536 of ground station service 115 of provider network 100, includes two or more satellite antennas, such as satellite antennas 1502 and 1520. In some embodiments, any of the ground stations described herein, such as ground stations 1442, 1444, and 1446 illustrated in FIG. 14, and ground stations.

Ground station 1536 includes a wideband receiver 1504, a narrowband receiver 1506, and other band receiver or receivers 1508 connected to satellite antenna 1502. Also, antenna control unit 1510 is connected to satellite antenna 1502. In a similar manner, wideband receiver 1522, narrowband receiver 1524, and other band receiver or receivers 1526 are connected to satellite antenna 1520, as is antenna control unit 1528.

In some embodiments, the wideband receivers, narrowband receivers, and/or other band receivers may include software defined radios and/or digitizers that convert analog signals transmitted to or received from satellites into digital signals. In some embodiments, the software defined radios and/or digitizers may perform demodulation, forward error correction and conversion of the digital signals into internet protocol formatted data (IP formatted data). In some embodiments, a router, such as router 1512, may route downlinked data from the wideband receiver, narrowband receiver, or other band receiver to an additional router 1514 that routes the downlinked data through a gateway 1538 to session instances 1534 instantiated for the client's contact session. The router 1514 may also route downlinked data to the ground station controller 1516. Additionally, the ground station controller 1516 may communicate with a satellite antenna ground station service scheduler, for example to determine which client is scheduled for a given time-slot and to apply configurations stored for the client during the client's time slot. In a similar manner, routers 1530 and 1532 along with gateway 1540 may route data downlinked from satellite antenna 1520 to client session instances 1534 and/or ground station controller 1516.

In some embodiments, ground station controller 1516 may control operations of satellite antenna 1502 or 1520 via commands routed to antenna control unit 1510 or antenna control unit 1528 via routers 1515 and 1512 or via routers 1532 and 1530.

In some embodiments, wideband receivers 1504 and 1522 and narrowband receivers 1506 and 1524 may include bidirectional digitizers with forward error correction (FEC) that convert between analog satellite signals and digital IP signals. In some embodiments, a data processing instance (included in session instances 1534) may further implement a receiver/modem, and front end processor. Additionally, data processing instances 1534 may include a command and control instance that allows a client to command and control the client's satellite.

In some embodiments, a client may utilize multiple satellite antennas to communicate with the client's satellite during a contact session. For example, in some embodiments, a client may communicate with the client's satellite using both satellite antenna 1502 and 1520 during the contact session. In some embodiments, a client may downlink as much as 7,000 megabits per second of data over two channels. In some embodiments, an electronically steered array of satellite antennas may allow for multiple contacts with a single satellite sensor, concurrently or sequentially.

Figure 16:
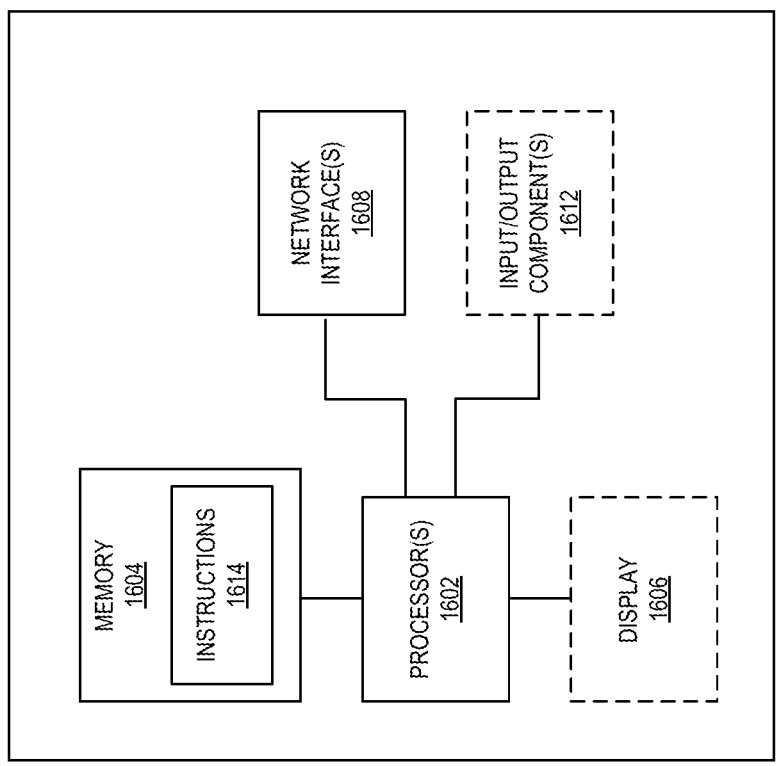
FIG. 16 illustrates a logical arrangement of a set of general components of an exemplary computing device that can be utilized in accordance with various embodiments.

FIG. 16 illustrates a logical arrangement of a set of general components of an example computing device 1600 such as a CDNN, etc. Generally, a computing device 1600 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1602 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1604) to store code (e.g., instructions 1614) and/or data, and a set of one or more wired or wireless network interfaces 1608 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1604) of a given electronic device typically stores code (e.g., instructions 1614) for execution on the set of one or more processors 1602 of that electronic device. One or more parts of various embodiments may be implemented using different combinations of software, firmware, and/or hardware.

A computing device 1600 can include some type of display element 1606, such as a touch screen or liquid crystal display (LCD), although many devices such as portable media players might convey information via other means, such as through audio speakers, and other types of devices such as server end stations may not have a display element 1606 at all. As discussed, some computing devices used in some embodiments include at least one input and/or output component(s) 1612 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   in a satellite of a content delivery network accessible to users of the content delivery network,
   receiving a request for a resource hosted by the content delivery network on behalf of a user of the content delivery network;
   determining that the request for the resource cannot be served by the satellite as the resource is not available in the satellite;
   determining a ground station to ask for the resource;
   sending a secondary request for the resource to the determined ground station;
   receiving the resource from the determined ground station;
   caching the received resource in the satellite and in at least one other satellite;
   responding to the request of the user using the received resource; and
   responding to a subsequent request using the cached received resource.

2. The computer-implemented method of claim 1, wherein the resource is one or more of multimedia content, webpage content, and a compute function.

3. A computer-implemented method comprising:
- receiving, by a satellite of a content delivery network from a user, a request for a resource hosted by the content delivery network;
- determining that the request for the resource cannot be served by the satellite;
- determining a first entity to ask for the resource, wherein the first entity to ask for the resource is a second satellite that is not accessible to users of the content delivery network of a provider network;
- sending a secondary request for the resource to the determined first entity;
- receiving the resource from the determined first entity;
- caching the received resource in the satellite;
- responding to the request from the user using the received resource for the resource; and
- responding to a subsequent request using the cached received resource.

4. The computer-implemented method of claim 3, wherein the resource is one or more of multimedia content, webpage content, and a compute function.

5. The computer-implemented method of claim 3, wherein determining that the request for the resource cannot be served by the satellite comprises:
- determining that the resource is not cached by the satellite.

6. The computer-implemented method of claim 3, wherein the satellite is in an orbit selected from a low earth orbit, a medium earth orbit, and a geo-synchronous orbit.

7. The computer-implemented method of claim 3, wherein the first entity, upon determining that it cannot serve the request is to ask a second entity for the resource, wherein the second entity is a third satellite that is not accessible to users of the content delivery network.

8. The computer-implemented method of claim 3, wherein the caching of the received resource is to cause another resource to be evicted based upon a caching algorithm.

9. The computer-implemented method of claim 3, further comprising:
- caching the received resource in a plurality of satellites of the content delivery network accessible to users of the content delivery network, wherein each satellite of the plurality of satellites does not need to be accessible to the users at any given point in time.

10. The computer-implemented method of claim 3, further comprising:
- receiving an update for the resource at a ground station service;
- pushing the update for the resource to the satellite from the ground station service; and
- uploading the update for the resource to the first entity.

11. The computer-implemented method of claim 3, further comprising:
- pre-fetching additional resources in response to the secondary request.

12. The computer-implemented method of claim 3, wherein the second satellite is in a different orbit than the satellite.

13. The computer-implemented method of claim 3, wherein the satellite is a part of the provider network.

14. A system comprising:
- a plurality of ground stations to store and provide one or more resources to one or more satellites of a content delivery network; and
- a content delivery network node, of the content delivery network, implemented by a first satellite capable of communication with ones of the plurality of ground stations, the content delivery node to:
  - receive a request for a resource hosted by the content delivery network,
  - determine that the request for the resource cannot be served by the satellite,
  - determine a first entity to ask for the resource, the first entity being one of the plurality of ground stations,
  - send a secondary request for the resource to the determined first entity,
  - receive the resource from the determined first entity,
  - cache the received resource in the first satellite and at least one other satellite,
  - respond, to a user of the content delivery network, to the request using the received resource for the resource, and
  - respond to a subsequent request using the cached received resource.

15. The system of claim 14, wherein the first satellite and the plurality of ground stations are a part of a provider network.

16. The system of claim 14, wherein the secondary request is to cause a pre-fetching of additional resources from a content origin.

17. The system of claim 14, further comprising:
- an origin resource provider to provide the resource to the first entity.

18. The system of claim 14, wherein the first satellite in a defined orbit selected from low earth orbit (LEO), medium earth orbit (MEO), and geo-synchronous orbit.

* * * * *